United States Patent
Song et al.

(10) Patent No.: US 12,533,388 B2
(45) Date of Patent: Jan. 27, 2026

(54) COMPOSITIONS AND METHODS FOR PREVENTION AND TREATMENT OF IMMUNE DEFICIENCY AND INFLAMMATION

(71) Applicant: The United States GOVERNMENT As Represented By The Department of Veterans Affairs, Washington, DC (US)

(72) Inventors: Moon K. Song, Washington, DC (US); David S. Bischoff, Washington, DC (US); Dean T. Yamaguchi, Washington, DC (US); Koichi Uyemura, Washington, DC (US); Ram Pyare Singh, Washington, DC (US)

(73) Assignee: The United States GOVERNMENT As Represented By The Department of Veterans Affairs, Washington, DC (US)

( * ) Notice: Subject to any disclaimer, the term of this patent is extended or adjusted under 35 U.S.C. 154(b) by 176 days.

(21) Appl. No.: 17/957,715

(22) Filed: Sep. 30, 2022

(65) Prior Publication Data
US 2023/0114037 A1  Apr. 13, 2023

Related U.S. Application Data

(63) Continuation of application No. 16/771,427, filed on Jun. 10, 2020, now abandoned.

(51) Int. Cl.

| | |
|---|---|
| A61K 33/30 | (2006.01) |
| A61K 9/00 | (2006.01) |
| A61K 9/48 | (2006.01) |
| A61K 38/12 | (2006.01) |
| A61K 47/54 | (2017.01) |

(52) U.S. Cl.
CPC ............ *A61K 38/12* (2013.01); *A61K 9/0053* (2013.01); *A61K 9/48* (2013.01); *A61K 33/30* (2013.01); *A61K 47/547* (2017.08)

(58) Field of Classification Search
None
See application file for complete search history.

(56) References Cited

U.S. PATENT DOCUMENTS

| | | | | |
|---|---|---|---|---|
| 5,834,032 A * | 11/1998 | Song | .................... | A61K 31/498 514/6.9 |
| 7,144,865 B2 | 12/2006 | Song | | |
| 2004/0185125 A1* | 9/2004 | Song | .................... | A23L 33/185 514/184 |

FOREIGN PATENT DOCUMENTS

CN 104706704 A * 6/2015

OTHER PUBLICATIONS

Song et al. "Metabolic relationship between diabetes and Alzheimer's Disease affected by Cyclo(HisOPro) plus zinc treatment"; BBA Clinical 7: 41-54. (Year: 2017).*
Banchereau, J. et al., "Dendritic Cells and the Control of Immunity", Nature 392:245-262 (1998).
Bellezza et al., "Neuroinflammation and Endoplasmic Reticulum Stress are Coregulated by Cyclo(His-Pro) to Prevent LPS Neurotoxicity", Int. J. Biochem. Cell Biol. 51:159-169 (2014).
Bleesing, J. et al., "Human B Cells Express a CD45 Isoform that is Similar to Murine B220 and is Downregulated with Acquistion of the Memory B-Cell Marker CD27", Cytometry B. Clin. Cytom. 51B:1-8 (2003).
Burrows, G. et al., "Two-Domain MHC Class II Molecules Form Stable Complexes with Myelin Basic Protein 69-89 Peptide That Detect and Inhibit Rat Encephalitogenic T Cells and Treat Experimental Autoimmune Encephalomyelitis", J. Immunol. 161:5987-5996 (1998).
Chen et al., "Molecular Cloning and Expression of Early T Cell Costimulatory Molecule-1 and its Characterization as B7-2 Molecule", J. Immunol. 152:4929-4936 (1994).
Cifarelli, V. et al., "Increased Expression of Monocyte CD11b (Mac-1) in Overweight Recent-Onset Type 1 Diabetic Children", Rev. Diabet. Stud. 4:113-120 (2007).
Fusetani, N., "Antifungal Peptides in Marine Invertebrates", Invertebrate Survival J. 7:53-66 (2010).
Goldman et al., "Evolution of Immunologic Functions of the Mammary Gland and the Postnatal Development of Immunity", Pediatr. Res. 43:155-162 (1998).
Guy, C. et al., "Organization of Proximal Signal Initiation at the TCR-CD3 Complex", Immunology Reviews 232:7-21 (2009).
Houston et al., Structure-Based Exploration of Cyclic Dipeptide Chitinase Inhibitors, J. Med. Chem. 47:5713-5720 (2004).
Huang et al., "$CD_4^+$ $CD_{25}^+$Treg cells and IgA nephropathy patients with tonsillectomy: a clinical and pathological study," Int. Urol. Nephrol., e-pub. ahead of print (2014).
Huntington, N. et al., "Developmental Pathways that Generate Natural-Killer-Cell Diversity in Mice and Humans", Nature Rev. Immunol. 7:703-714 (2007).
Jensen, G. et al., "Selective Expression of CD45 Isoforms Defines CALLA+ Monoclonal B-Lineage Cells in Peripheral Blood From Myeloma Patients as Late Stage B Cells", Blood 78:711-719 (1991).
Koo et al., "Protective Effect of Cyclo(His-Pro) on Streptozotocin-Induced Cytotoxicity and Apoptosis In Vitro", J. Mol. Biotechnol. 21(2):218-227 (2011).
McMaster, WR et al., "Identification of La Glycoproteins in Rat Thymus and Purification From Rat Spleen", Eur. J. Immunol. 9:426-433 (1979).
Mackay, C. "Dual Personality of Memory T Cells", Nature 401:659-660 (1999).
Malek, T., "The Main Function of IL-2 is to Promote the Development of T Regulatory Cells", J. Leukoc. Biol. 74:961-965 (2003).
Malissen, B., "CD3ITAMs Count!", Nature Immunology 9:583-584 (2008).
Minelli, A. et al., "Cyclo(His-Pro) Exerts Anti-Inflammatory Effects by Modulating NF-κB and Nrf2 Signalling", Int. J. Biochem. Cell Biol. 44:525-535 (2012).

(Continued)

*Primary Examiner* — Susan T Tran
(74) *Attorney, Agent, or Firm* — BALLARD SPAHR LLP

(57) ABSTRACT

Prevention and treatment of immune deficiency and inflammation using cyclic histidyl-proline plus zinc (Cyclo-Z).

11 Claims, 12 Drawing Sheets

(56) References Cited

OTHER PUBLICATIONS

Morikawa, K. et al., The Role of CD45RA on Human B-Cell Function: Anti-CD45RA Antibody (Anti-2H4) Inhibits the Activation of Resting B Cells and Antibody Production of Activated B Cells Independently in Humans, Scand. J. Immunol. 34:273-283 (1991).
Morikawa, K. et al., "The Role of CD45 in the Activation, Proliferation and Differentiation of Human B Lymphocytes", Int. J. Hematol. 54:495-504 (1991).
Mosmann, T. et al., "Functions of CD8 T-Cell Subsets Secreting Different Cytokine Patterns", Semin. Immunol. 9:87-92 (1997).
Peach, R. et al., "Both Extracellular Immunoglobin-Like Domains of CD80 Contain Residues Critical for Binding T Cell Surface Receptors CTLA-4 and CD28*", J. Biol. Chem. 270:21181-21187 (1995).
Rink, L., et al., "Zinc and the immune system," Proc. Nutr. Soc. 59:541-552 (2000).
Shale, M. et al., "CD4+ T-Cell Subsets in Intestinal Inflammation", Immunol. Rev. 252:164-182 (2013).
Smith-Garvin, J. et al., "T Cell Activation", Annual Rev. Immunology 27:591-619 (2009).
Song, M. et al., Synergistic Antidiabetic Activities of Zinc, Cyclo (His-Pro), and Arachidonic Acid, Metabolism 50:53-59 (2001).
Strauss-Ayali, D. et al., "Monocyte Subpopulations and Their Differentiation Patterns During Infection", J. Leukoc. Biol. 82:244-252 (2007).
Triplett, T. et al., "Defining a Functionally Distinct Subset of Human Memory CD4+ T Cells that are $CD25^{POS}$ and $FOXP3^{NEG}$", Eur. K. Immunol. 42:1893-1905 (2012).
Usharauli, D., "Dendritic Cells and the Immunity/Tolerance Decision", Med. Hypo. 64:112-113 (2005).
Viardot et al., "The Effects of Weight Loss and Gastric Banding on the Innate and Adaptive Immune System in Type 2 Diabetes and Prediabetes", J Clin Endocrinol Metab. Jun. 2010; 95(6):2845-50.
Wellinghausen, N. et al., "The Significance of Zinc for Leukocyte Biology", J. Leukoc. Biol. 64:571-577 (1998).
Yen, H. et al., "Tc17 CD8 T Cells: Functional Plasticity and Subset Diversity[1]", J. Immunol. 183:7161-7168 (2009).
Zheng, Y. et al., "CD86 and CD80 Differentially Modulate the Suppressive Function of Human Regulatory T Cells[1]", J. Immunol. 172:2778-2784 (2004).
International Search Report and Written Opinion mailed May 7, 2019 in PCT/US2018/65012, filed Dec. 11, 2018.
U.S. Appl. No. 62/597,106, filed Dec. 11, 2017, Song (The US Government as Represented by the Dept of Veterans Affairs).
U.S. Appl. No. 16/771,427, filed Jan. 11, 2018, Song (The US Government as Represented by the Dept of Veterans Affairs).
PCT/US2018/065012 (WO 2019/118502), Dec. 11, 2018 (Jun. 20, 2019), Song (The US Government as Represented by the Dept. of Veterans Affairs).

\* cited by examiner

A

Blood NK CD161A Small

COMPOSITIONS AND METHODS FOR PREVENTION AND TREATMENT OF IMMUNE DEFICIENCY AND INFLAMMATION

This application is a Continuation of U.S. patent application Ser. No. 16/771,427, filed Jun. 10, 2020, which claims priority to U.S. Provisional Patent App. No. 62/597,106, filed on Dec. 11, 2017, each of which are hereby incorporated herein by reference in their entireties.

BACKGROUND

Field of the Invention

The embodiments described herein are generally directed to the prevention and treatment of immune deficiency and inflammation.

Description of the Related Art

Diabetes refers to a group of metabolic diseases affecting various interrelated processes, including glucose uptake, energy utilization, immune function, weight control, and inflammation, and is used as a model of other immune-related and inflammation-related disorders.

Type 1 diabetes (T1D) is an autoimmune disease, affecting more than 1.25 million Americans, in which immune cells attack and destroy the insulin-producing β-cells of the pancreas, resulting in an inability to produce insulin and to regulate blood sugar levels.

Type 2 diabetes (T2D) is a metabolic disorder, defined by insulin resistance in peripheral tissues, such as liver, fat, and muscle, and ultimately leads to a loss of pancreatic p-cell function, resulting in severe diabetics and insufficient or no insulin secretion. Most obese subjects develop insulin resistance and some develop diabetes. From a global health and economic perspective (World Health Organization), the incidence of T2D is increasing with a reported 422 million people diagnosed in 2014 worldwide and about 30 million in the U.S. alone. If poorly controlled, T2D can lead to devastating health effects, including impaired wound healing, amputation, renal failure, cardiovascular disease, neuropathy, and retinopathy. Although T2D can be controlled through strict dietary regulation and routine intensive exercise, a large number of patients require clinical therapies.

Current treatments for diabetes primarily focus on lowering blood glucose levels. For example, current treatments for T2D include insulin, metformin, sulphonylureas, thiazolidinediones, α-glucosidase inhibitors, incretin hormone-based therapy, and sodium-dependent glucose co-transporter inhibitors. Each of these treatments can improve glycemia and, in some cases, even delay the onset of diabetes. However, none of these treatments have the disease-modifying characteristic of slowing the progressive decline in insulin sensitivity. The use of insulin as a treatment may also affect the risk of hypoglycemia.

Inflammation is a common mechanism in the pathophysiology of diabetes and obesity, since it increases insulin resistance and islet cell inflammation, leading to defects in β-cell secretion. Obesity-associated adipose tissue inflammation is a major cause of the decreased insulin sensitivity in T2D. Hyperglycemia increases glycation of hemoglobin, formation of reactive oxygen species, and dysregulation of nitric oxide synthase, resulting in increased activation of NF-κB and subsequent increases in pro-inflammatory cytokines (IL-1, IL-6, TNF-α), chemokines such as CCL-2, 58, 10, 12, and adhesion molecules, including intercellular adhesion molecule-1 (TCAM-1) and vascular cell adhesion molecule-1 (VCAM-1). This leads to activation of endothelial cells, recruitment of inflammatory cells, increased levels of vascular endothelial growth factor (VEGF), and Angiopoietin 2. Targeting inflammation is a new strategy for the management of diabetes mellitus and its associated complications, which ideally will lead to better glycemic control and a decrease in micro- and macro-vascular complications, including cardiovascular disease. Early recognition of the inflammatory status of a predisposed individual may also lead to earlier initiation of therapy.

Recently, correlations between the immune system and diabetes have been established. High blood sugar levels can weaken the patient's immune system. T1D involves autoimmune destruction of the pancreatic β-cells, which produce insulin. Circulating immune cells from T1D subjects also displayed many aspects of a pro-inflammatory state by primed or activated CD11b$^+$ monocytes. It has been proposed that problems with immune function, in response to bacterial and viral infections, may cause insulin deficiency in T1D. Patients with diabetes are known to have infections more often than those with normal glucose metabolism. Thus, diabetes causes a decrease in immune function and an increase in susceptibility to certain infections.

The main goal of therapy should be to stimulate the innate immune system to protect against cold, influenza, and many other infectious diseases and to suppress inflammatory diseases such as T1D. Optimal management should include the early initiation of combination therapy using multiple drugs with different mechanisms of action—particularly ones which target the pathophysiological defects present in T2D.

SUMMARY

Accordingly, the inventors have developed an anti-metabolic drug, cyclic histidyl-proline (Cyclo [His-Pro]) plus zinc (Cyclo-Z), which modulates several components of inflammation and may be beneficial for the treatment of a host of other inflammatory/autoimmune diseases, including T1D and T2D.

In the studies described herein, Cyclo-Z treatment invariably increased immune cell levels and activities involved in normally presenting cells (dendritic cells, monocytes, natural killer cells), inducible immune cells (cytotoxic CD8$^+$ and helper CD4$^+$ T-cells, antigen presenting cells), and humoral cells (B-cells), when test subjects—in this case, rats—were young and the immune system still immature (three months old), in both diabetic and normal test subjects. Thus, Cyclo-Z is effective in the stimulation of cell growth and immune system components, which may be helpful in fighting infectious agents earlier than possible in young untreated target subjects (e.g., human patients). In older normal animals, Cyclo-Z treatment modulates levels of several components involved in inflammation (decreasing monocytes, CD8$^+$ T-cells levels) and autoimmune diseases (increasing CD4$^+$ helper T-cells levels), suggesting potential benefits in treatment of autoimmune diseases (such as T1D, allergies, psoriasis, Lupus, and arthritis) in target subjects.

Cyclo-Z treatment is a natural, revolutionary, anti-metabolic and anti-inflammatory therapeutic, which suppresses NF-κB signaling, effectively reversing diabetes, restoring β-cell activity, and improving body weight control without toxicity. It can be used to treat a wide variety of inflammatory and autoimmune-derangement syndromes, including T1D and T2D, and associated conditions.

There are two arms of the mammalian of immune system: innate and adaptive immunity. The innate immune system leukocytes include Natural killer (NK) cells, mast cells, eosinophils, basophils, and the phagocytic cells, including macrophages, neutrophils, and dendritic cells (DC), and function within the immune system by identifying and eliminating pathogens that might cause infection. Macrophages ($CD11b^+$) are professional phagocytes and are highly specialized in the removal of dying or dead cells and cellular debris. NK cells are effector lymphocytes that control several types of tumors and microbial infections by limiting their spread and subsequent tissue damage. DCs are antigen-presenting cells that act as messengers between the innate and the adaptive immune systems. DCs main function is to process antigen material and present it on the cell surface to the T-cells.

The disclosed study indicates that Cyclo-Z treatment modulated the population of several types of innate immune cells in both diseased and normal test subjects (rats). Cyclo-Z suppressed macrophage levels in STZ-induced diabetic test subjects, which exhibit high levels of macrophages in comparison to healthy subjects. However, Cyclo-Z treatment slightly increased macrophage levels in normal test subjects. DC levels were elevated in Cyclo-Z-treated diabetic test subjects, compared to control diabetic test subjects, and slightly elevated in normal test subjects. Cyclo-Z treatment did not affect $CD161^-$ NK cell populations in mature normal test subjects. Although, at the initial stage of STZ injection, Cyclo-Z treatment increased levels of both $CD161A^+$ NK and $CD11b^+$ macrophage cells, at later stages of Cyclo-Z treatment, when invading antigen levels declined and inflammation is suppressed, NK and macrophage levels were reduced in both diseased and healthy test subjects. This role in immunity and chronic inflammation is important, as the early stages of inflammation are dominated by neutrophils, which are ingested by macrophages.

Adaptive immunity serves to protect the body from an infectious disease agent. It is mediated by B-lymphocytes and T-lymphocytes following exposure to a specific antigen, and characterized by immunological memory. There are two types of adaptive immune responses: humoral immunity, mediated by antibodies that are produced by B-lymphocytes; and cell-mediated immunity, facilitated by T-lymphocytes. $CD4^+$ T-helper cells are white blood cells that are an essential part of the adaptive immune system. One of their main roles is to send signals to other types of immune cells, including $CD8^+$ killer cells, which then destroy and inactivate the infectious particles.

Levels of both $CD4^+$ and $CD8^+$ T-cells did not change in young test subjects. However, when aged normal test subjects were treated with Cyclo-Z, $CD4^+$ increased and CD8+ decreased. $CD3^+$ T-cell co-receptor helps to activate both the cytotoxic T-Cell ($CD8^+$ naive T-cells) and also T helper cells ($CD4^+$ naive T-cells). Cyclo-Z treatment increased $CD3^+$ cells in diabetic test subjects but decreased $CD3^+$ cells in normal test subjects. CD86 and CD80 are proteins expressed on antigen-presenting cells (AP) that provide co-stimulatory signals necessary for T-cell activation and survival. However, CD80 and CD86 differentially regulate mechanical interactions of T-cells with antigen-presenting DCs and B-cells. Similarly to CD3, CD4, and CD8 T-cells, levels of $CD86^+$ and CD80 T-cells increased in Cyclo-Z-treated STZ-diabetic test subjects, while populations were suppressed in normal test subjects. The regulatory T-cell (Treg) is a subpopulation of T-cells which modulate the immune system, maintain tolerance to self-antigens, and preventing autoimmune reactions and disease. Tregs exhibit $CD4^+$, $FOXP3^+$, and $CD25^+$ biomarkers and are thought to be derived from the same lineage as naïve CD4 cells. Because effector T-cells also express CD4 and CD25, Tregs are very difficult to effectively discern from effector $CD4^+$, making them difficult to study.

The described data show a subset of cells express higher levels of $CD25^+$ in STZ-induced diabetic test subjects than in normal test subjects, and Cyclo-Z treatment further increased this $CD25^+$ population. The role of CD45RA on human R-cell function anti-CD45RA antibody inhibits the activation of resting B-cells and antibody production of activated B-cells independently in humans. $CD45RA^+$ cell levels are higher in diabetic test subjects than in normal test subjects. Cyclo-Z treatment further increased this $CD45RA^+$ population in young STZ-induced diabetic test subjects, but lowered $CD45RA^+$ levels in aged test subjects. Thus, Cyclo-Z treatment stimulates the adapted immune system $CD4^+$ $CD25^+$ T-cell (T-cell mediated) and the $CD45RA^+$ (humoral) B-cell population of the adaptive immune system. The combined data demonstrate that Cyclo-Z treatment can regulate inflammation and different cell populations in both the innate and adaptive immune systems of diseased and healthy subjects depending on the age and level of the disease.

In an embodiment, a pharmaceutical composition to treat immune disorder and inflammation in mammals is disclosed. The composition comprises: zinc salt comprising zinc cation and anion; purified cyclic histidyl-proline (CHP); and a pharmaceutically-acceptable excipient. The zinc salt may comprise, for example, zinc chloride, zinc oxide, or zinc carbonate.

In another embodiment, the composition comprises a capsule that comprises: a zinc chelating agent; cyclic histidyl-proline (CHP); and one or more excipients. The capsule may be a hard or soft gel capsule. Each capsule may comprise 10-150 (e.g., 10-100 mg) of zinc and/or 3-50 mg (e.g., 3-30 mg) of CHP, depending on the age, gender, and/or physiological condition of the patient.

In another embodiment, a method of treating a disease of a patient is disclosed. The method comprises administering cyclic histidyl-proline plus zinc (Cyclo-Z) to the patient. The Cyclo-Z may be orally administered, for example, via a capsule taken 1-4 times per day between waking up and breakfast, between breakfast and lunch, between lunch and dinner, and/or between dinner and bedtime (e.g., 4 times per day consisting of once during each of these time periods, 2 times per day consisting of once between waking up and breakfast and once between breakfast and dinner or bedtime, 1 time per day at bedtime, etc.). The Cyclo-Z may comprise 5 mg per liter of cyclic histidyl-proline and 20 mg per liter of zinc. The disease(s), treated using the Cyclo-Z, may include an immune-disorder or inflammatory disease, including, for example, a cold, influenza, a bacterial infection, an allergy, type-one diabetes, and/or type-two diabetes.

BRIEF DESCRIPTION OF THE DRAWINGS

The details of the present invention may be gleaned in part by study of the accompanying drawings, in which like reference numerals refer to like parts, and in which.

DETAILED DESCRIPTION

Figures 1A, 1B, 1C:
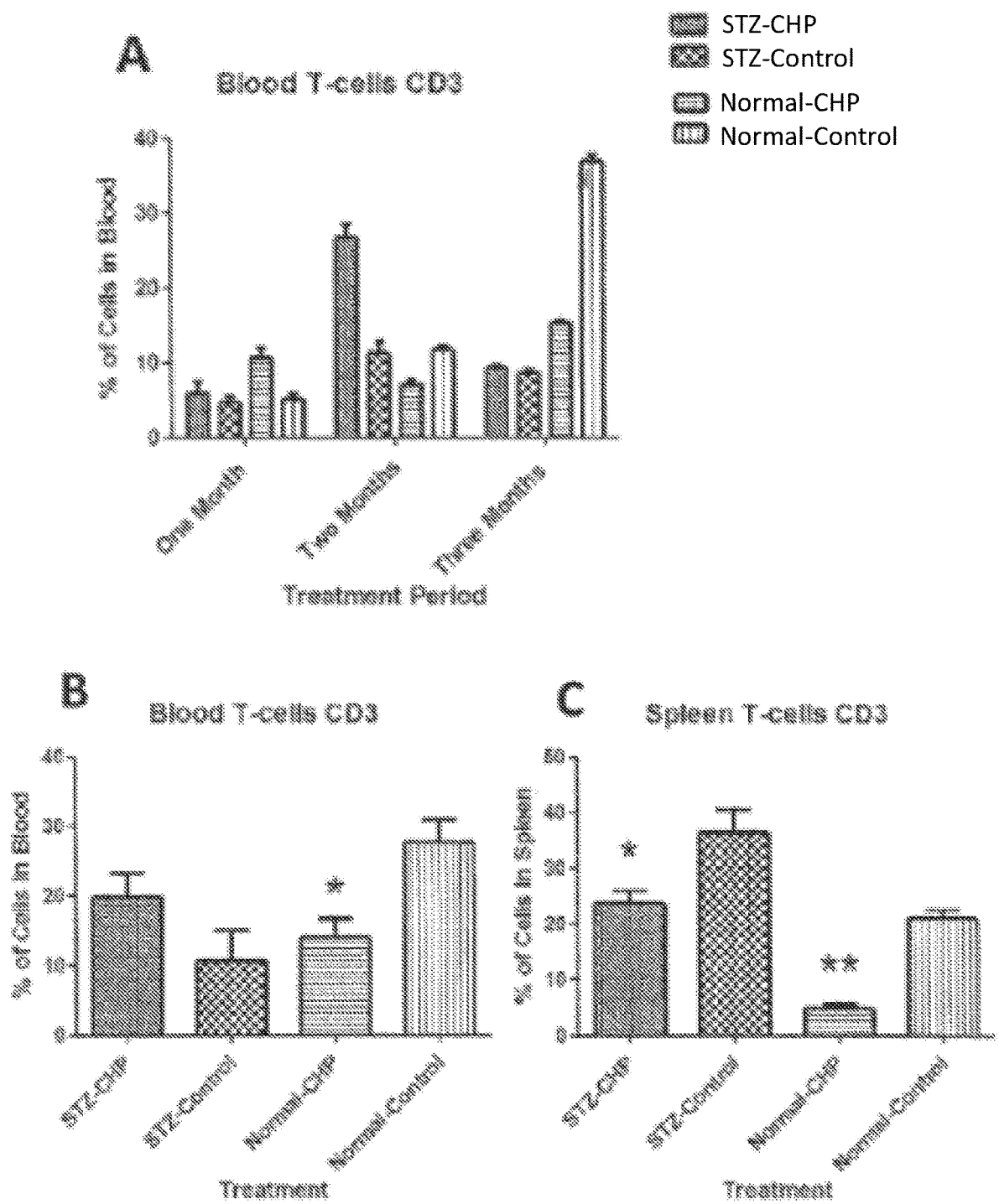
FIG. 1A. FACS analysis of $CD3^+$ T-cell population in blood over three-month time course. Rats were injected with streptozocin (30 mg/Kg STZ) to induce diabetes. Treatment with Cyclo-Z (10 mg CHP plus 10 mg zinc/4 L) was started two weeks after STZ injection and confirmation of diabetes. Each group had 4-6 test subjects (in this case, rats): diabetic with Cyclo-Z (STZ-CHP); diabetic without Cyclo-Z (STZ- Control); normal with Cyclo-Z (Normal-CHP); and normal without Cyclo-Z (Normal-Control). Blood was tested at three time points over the course of the study: one month of treatment (three months old); two months of treatment (four months old); and three months of treatment (five months old). Blood was pooled for like groups prior to FACS analysis for $CD3^+$ T-cell levels. The high specificity, combined with the presence of CD3 at all stages of T-cell development, makes it a useful immunohistochemical marker for T-cells in tissue sections. The CD3 antigen remains present in almost all T-cell lymphomas and leukemias, and therefore, can be used to distinguish them from superficially similar B-cell and myeloid cells.
FIG. 1B. FACS analysis of $CD3^+$ T-cell population in blood after four months of treatment (six months old). Test subjects in each group were sacrificed. For each individual test subject, blood was collected and analyzed for $CD3^+$ T-cell levels, and the mean±standard error of the mean (SEM) of each group plotted in FIG. 1B.
FIG. 1C. FACS analysis of $CD3^+$ T-cell population in spleen after four months of treatment (six months old). Test subjects in each group were sacrificed. For each individual test subject, the spleen was collected and analyzed for $CD3^+$ T-cell levels, and the mean±SEM of each group was plotted in FIG. 1C. $*p<0.05$ in comparison to untreated control for each group, diabetic or normal.

Embodiments of compositions and methods for treating and preventing immune deficiency and inflammation are described. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Introduction

Diabetes refers to a group of metabolic diseases affecting various interrelated processes including glucose uptake, energy utilization, immune function, weight control, and inflammation, and is characterized by excessive amounts of glucose in the blood. This condition is triggered by the body's defect(s) in insulin production, insulin action, or both. Recently, correlations between the immune system and diabetes have been established. High blood sugar levels can weaken the patient's immune system. Viardot et al. reported that energy restriction after gastric banding attenuates activation of circulating immune cells of both the innate and adaptive immune system. Defects in the deletion of autoactive T-cells and in the function of T regulatory cells contribute to the autoimmune response characteristic of T1D. In T1D, autoimmune destruction of the pancreatic β-cells, which produce insulin, results in insulin deficiency directly inducing the diabetic condition. Circulating immune cells from T1D subjects also displayed many aspects of a pro-inflammatory state, as indicated by primed or activated monocyte CD11b. In T2D, it has been proposed that problems with immune function in response to bacterial and viral infections may cause insulin resistance and induce T2D. Patients with diabetes are known to have infections more often than those with normal glucose metabolism. Thus, it is not uncommon for inflammatory diseases, such as diabetes, to cause a decrease in immune function and an increase in susceptibility to certain infections.

Zinc plays an important role in the immune system—particularly in the development and normal functions of neutrophils and NK cells. Zinc levels should be taken into account whenever alterations of immune functions are observed in vitro or in vivo. Zinc-deficient patients have increased susceptibility to a variety of pathogens, and zinc deficiency may be responsible for decreased cell-mediated immune functions. The specific interaction of zinc with immunologically important proteins, signal transduction components, and membrane functions has been summarized in "The significance of zinc for leukocyte biology," by Wellinghausen et al., J. Leukoc. Biol. 64:571-577 (1998), which is hereby incorporated herein by reference. Zinc also has a profound effect on immunosuppression and inflammation, leading to the therapeutic use of it as a treatment for many immune system disorders. Zinc has a crucial effect for development and normal functions of neutrophils and NK cells, as discussed in "Zinc and the immune system," by Shankar et al., Proc. Nutr. Soc. 59:541-552 (2000), which is hereby incorporated herein by reference. In zinc-deficient patients, B-lymphocyte development and antibody production—particularly immunoglobulin G production—is compromised. Macrophage functions are also adversely affected by zinc deficiency, which can result in abnormal intracellular killing, cytokine production, and phagocytosis. In human studies in India, zinc supplementation has been shown to improve cellular immune status. Thus, improvement of zinc nutriture in children or zinc-deficient subjects may provide an important preventive intervention for high infectious disease morbidity and associated mortality in developing countries.

Cyclo (His-Pro) (CHP) is a naturally occurring cyclic dipeptide that is a metabolite of thyrotropin-releasing hormone (TRH) and functions as a transporter of zinc into cells. CHP is proven to have antibacterial and antifungal activities and can inhibit the growth of *Saccharomyces cerevisae* by inhibiting chitinase, as discussed in "Antifungal peptides in marine invertebrates," by Fusetani, Invertebrate Survival J. 7:53-66 (2010), and "Structure-based exploration of cyclic dipeptide chitinase inhibitors," by Houston et al., J. Med. Chem. 47:5713-5720 (2004), respectively, which are each hereby incorporated herein by reference. It has a protective and therapeutic effect on streptozocin (STZ)-induced cytotoxicity and apoptosis, and exerts anti-inflammatory effects by suppressing pro-inflammatory NF-κB signaling via Nrf2-mediated heme oxygenase-1 activation, as discussed in "Cyclo (his-pro) exerts anti-inflammatory effects by modulating NF-κB and Nrf2 signaling," by Minelli et al., Int. J. Biochem. Cell Biol. 44:525-535 (2012), which is hereby incorporated herein by reference. CHP has also been shown to protect against glial inflammation and other neuro-inflammatory diseases, including lipopolysaccharide neurotoxicity, as discussed in "Neuroinflammation and endoplasmic reticulum stress are coregulated by Cyclo (His-Pro) to prevent LPS neurotoxicity," by Bellezza et al., Int. J. Biochem. Cell Biol. 51:159-169 (2014), which is hereby incorporated herein by reference. STZ-induced cytotoxicity and apoptosis was prevented in rat insulinoma cells (RINm5F), as discussed in "Protective effect of Cyclo (his-pro) on steptozotocin-induced cytotoxicity and apoptosis in vitro," by Koo et al., J. Mol. Biotechnol. 21:218-227 (2011), which is hereby incorporated herein by reference. CHP also exhibited anti-diabetic effects on STZ-induced diabetic mice, as discussed in "Synergistic anti-diabetic activities of zinc, cyclo (his-pro) and arachidonic acid," by Song et al., Metabolism 50:53-59 (2001), which is hereby incorporated herein by reference. Oral glucose tolerance test (OGTT) values significantly decreased, and plasma glucose levels dropped 60%, as compared to the STZ-induced diabetic control group without CHP treatment. Thus, CHP exhibits anti-diabetic and anti-toxicity effects on STZ-induced diabetic rats and cells.

Oral administration of Cyclo-Z (CHP+zinc) has been demonstrated to be effective in improving—and effectively reversing—diabetes in STZ-induced T1D rats, in T2D Goto-Kakizaki (G-K) rats, and in T2D ob/ob mice. In addition, Cyclo-Z improved body weight control in aged T2D G-K rats and obese and overweight Sprague-Dawley rats. All of these studies indicate that the combination of CHP+zinc in the Cyclo-Z formulation is much more effective than zinc or CHP alone.

Based on studies showing a link between zinc and immune functions, Cyclo-Z treatment may improve basic immune system parameters in both STZ-induced diabetic subjects and possibly in normal subjects. Thus, the inventors examined the effect of Cyclo-Z on the levels and activation of several major immune system cell components in STZ-induced diabetic (as a model of inflammatory and immune-deficient disease) and in normal control test subjects (in this case, rats).

2. Materials and Methods

A study was conducted on sixty Fisher 344 female and male rats, aged five to six weeks. Diabetes was induced by subcutaneous injection of streptozotocin (STZ, 30 mg/kg, Sigma-Aldrich, St. Louis, MO) in 0.1 M sodium citrate/citric acid buffer (pH 4.5). Rats were housed individually in separate cages and fed a low zinc (6 ppm) diet (Newco Distributors, Inc., Rancho Cucamonga, CA). Venous blood was collected from the tail for blood glucose determination starting one week after STZ injection at the initiation of CHP plus zinc treatment. Blood glucose levels were analyzed using an AlphaTRAK 2 portable glucose analyzer (Abbott Laboratories, Chicago, IL). Diabetes induction was considered to be successful when glucose levels were greater than 300 mg/dL. Rats were then divided into four groups of matched blood glucose levels: Group 1 diabetic rats receiving drinking water containing the Cyclo-Z formulation [CHP (5 mg/L) plus zinc (83 mg/L)]; Group 2 diabetic rats receiving normal drinking water; Group 3 normal rats receiving drinking water containing the Cyclo-Z formulation; and Group 4 normal rats receiving normal drinking water. Furthermore, urine glucose determinations were made by placing each test subject in a metabolic chamber, collecting their excreted urine, and measuring urine glucose levels (OneTouch Ultra 2 glucose meter, LifeScan, Inc. New Brunswick, New Jersey). Weekly blood and urine glucose measurements, body weight, food, and water intake were measured throughout the timeframe of treatment. Once a month and under sterile conditions, peripheral blood was collected from the saphenous vein into heparin-rinsed tubes for fluorescence-activated cell sorting (FACS) analysis. At the conclusion of the experiment (six months old, four months of treatment), the animals were terminated with $CO_2$ inhalation, and the spleen, and blood collected by cardiac puncture for analysis by FACS.

3. Flow Cytometry Analysis

Two ml of red blood cell lysing solution was added to each tube containing up to 200 μl of whole blood and incubated at room temperature, protected from light, for fifteen minutes. Cell suspensions were washed, centrifuged, re-suspended, and incubated with specific antibodies. Samples were then analyzed on a Becton Dickinson (BD)

FACSJazz™ flow cytometer with BD FACS™ sorter software. In addition, after four months of treatment, the spleens of each test subject were excised and processes by rubbing on 40 μm sterile filters to generate single cells, and then stained for FACS analysis. Antigen staining was carried out using conjugated primary antibodies at room temperature for twenty minutes. Fluorescently conjugated antibodies were purchased from eBiosciences (San Diego, CA) or RI Pharmingen (San Jose, CA) and are outlined in Table 1 below:

TABLE 1

List of FACS Antibodies

| Antibody | Marker | Catalog No. |
|---|---|---|
| Rat T Lymphocyte Cocktail | | 558493 |
| APC anti-Rat CD3 | Total T lymphocytes | |
| PE anti-Rat CD4 | $T_{CD4}$ lymphocytes | |
| FITC anti-Rat CD8a | $T_{CD8}$ lymphocytes | |
| Rat Activated T Lymphocyte Cocktail | | 558494 |
| APC andi-Rat CD3 | Total T lymphocytes | |
| PE anti-Rat DC25 | Activated T lymphocytes | |
| FITC anti-Rat RT1B | Activated T lymphocytes | |
| Rat T/B/NK Cell Cocktail | | 559495 |
| APC anti-Rat CD3 | Total T lymphocytes | |
| PE anti-Rat CD45RA | Total B lymphocytes | |
| FITC anti-Rat CD161a | Total Natural Killer cells | |
| APC anti-Rat CD3 | Total T lymphocytes | 557030 |
| PE anti-Rat CD80 | Antigen Presenting Cells | 555014 |
| FITC anti-Rat CD86 | Antigen Presenting Cells | 555018 |
| PE-Cy™5 anti-Rat CD45RA | Total B lymphocytes | 557015 |
| PE anti-Rat CD11b | Total monocytes | 5620105 |
| anti-Rat Dendritic Cells | Dendritic Cells Primary | 555010 |
| FITC anti-Mouse IgG1 | Dendritic Cells Secondary | 553443 |
| Isotype Control Cocktail | | 558509 |
| APC mIgG1 | Isotype | |
| PE mIgG1 | Isotype | |
| FITC mIgG1 | Isotype | |
| FITC Mouse IgG1, K Isotype | Isotype | 550616 |
| PE-Cy™5 Mouse IgG1, K Isotype | Isotype | 550618 |
| APC Mouse IgM, K Isotype | Isotype | 550883 |

Cells were then washed in phosphate buffered saline (PBS) at 350×g for five minutes and re-suspended in 400 μL of PBS. For dendritic cell analysis only, the cell staining, washing, and suspension protocol was repeated with a secondary conjugated antibody, since no primary conjugated antibody was available. For each staining reaction, 20-50,000 FACS events were acquired. Unlabeled cells or cells labelled with isotype control antibodies were used as negative controls.

4. Statistics

FIGS. 1A-12C represent the results of the analysis. Comparisons between different groups were performed with two-tailed unpaired non-parametric Mann-Whitney tests. Data are expressed as mean f standard error of the mean (SEM).

5. Results

Animals were treated with Cyclo-Z beginning at the age of two months, and blood samples analyzed by FACS at one, two, and three months of treatment corresponding to three, four, and five months of age, respectively. Over a time course, blood was pooled from like-treated subjects and then analyzed as one sample for cell counts at each of these time points, (FIGS. 1A, 2A, 3A, 4A, 5A, 6A, 7A, 8A, 9A, 10A, 11A, and 12A). After an additional one-month treatment period (six months old, four months of treatment), the blood and spleen were collected from each test subject and analyzed by FACS individually. Then, the data from each group was combined (FIGS. 1B, IC, 2B, 2C, 3B, 3C, 4B, 4C, 5B, 5C, 6B, 6C, 7B, 7C, 8B, 8C, 9B, 9C, 10B, 10C, 11B, 11C, 12B, 12C).

5.1. T-Cells CD3

The Cluster of Differentiation (CD) 3 (CD3) T-cell co-receptor binds non-covalently to the T-cell receptor during early maturation of T-cells and results in activation of the T-lymphocytes, as discussed in "CD3 ITAMs count!," by Malison, Nature Immunology 9:583-584 (2008), "Organization of proximal signal initiation at the TCR: CD3 complex," by Guy et al., Immunology Reviews 232:7-21 (2009), and "T-Cell activation," by Smith-Garvin et al., Annual Rev. Immunology 27:591-619 (2009), each of which is hereby incorporated herein by reference. Defects in CD3 gene protein expression result in Severe Combined Immune Deficiency Disorder, characterized by severe defects in T-cell production or function. Thus, CD3 is an excellent marker for total T-cells.

As shown in FIG. 1A, the percentage of CD3-bound T-lymphocytes is higher in the Cyclo-Z treated groups, regardless of health (diabetic or normal), at a young age with only one month of treatment. During the aging process, both normal and control test subjects had increased $CD3^+$ expression with age (four to five month old). In diabetic test subjects, the level of $CD3^+$ T-cells continued to increase with treatment. However, Cyclo-Z treatment decreased $CD3^+$ T-cells levels in the older normal non-diabetic test subjects after two and three months of treatment. This pattern was also seen in the blood and spleen samples from six-month-old test subjects treated for four months with Cyclo-Z (FIGS. 1B and 1C), where Cyclo-7 treatment significantly decreased levels in blood (p=0.0336) and spleen (p=0.0028). In the diabetic blood samples, the trend was increased levels of $CD3^+$ cells in blood (p=0.1143) and significantly decreased levels of $CD3^+$ cells in the spleen (p=0.05). Therefore, in diabetic test subjects, Cyclo-Z treatment increased levels of $CD3^+$ T-lymphocytes in the blood at all ages. In normal healthy non-diabetic test subjects, Cyclo-Z treatment increased $CD3^+$ T-cells in younger test subjects, but decreased levels of $CD3^+$ T-cells in older test subjects.

In normal test subjects, at time points other than the very young one-month-old test subjects, Cyclo-Z treatment significantly suppressed T-cell production. However, in STZ-treated test subjects, T-cells increased in the blood, but decreased in the spleen. These data indicate that Cyclo-Z treatment can modulate T-cell production depending on the physiological state to the subject.

Further analysis was conducted to evaluate the subset and activation state of the T-lymphocyte population.

5.2. T-cells Subset CD4

Figure 2A:
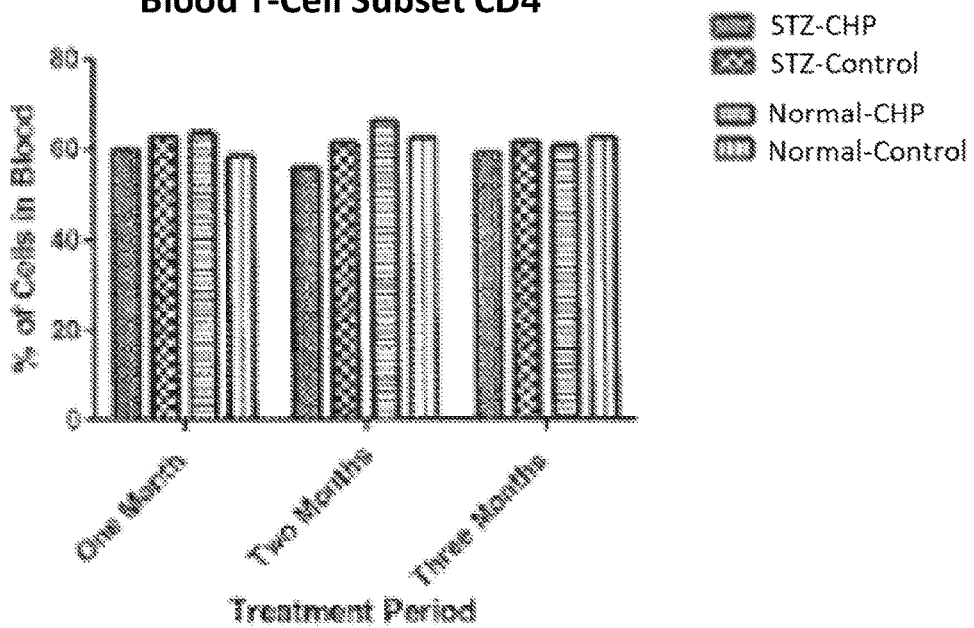
FIG. 2A. FACS analysis of $CD3^+$ $CD4^+$ Helper T-cell population in blood over three-month time course. Analysis of the same blood samples used in FIG. 1A. Blood was pooled for like groups, prior to FACS analysis for $CD3^+$ $CD4^+$ T-cell levels.
Figure 2B:
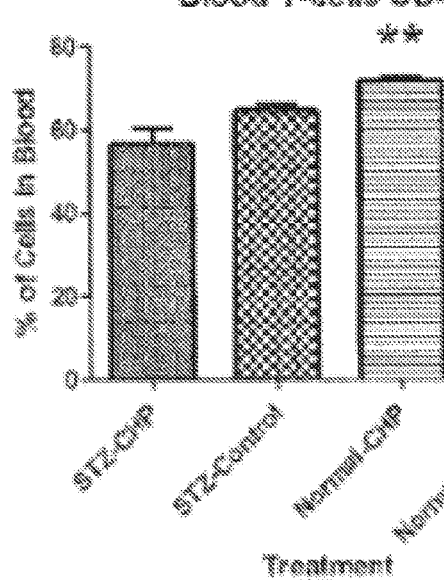
FIG. 2B. FACS analysis of $CD3^+$ $CD4^+$ Helper T-cell population in blood after four months of treatment (six months old). Test subjects in each group were sacrificed. For each individual test subject, blood was collected and analyzed for $CD3^+$ $CD4^+$ T-cell levels, and the mean±SEM of each group was plotted in FIG. 2B.
Figure 2C:
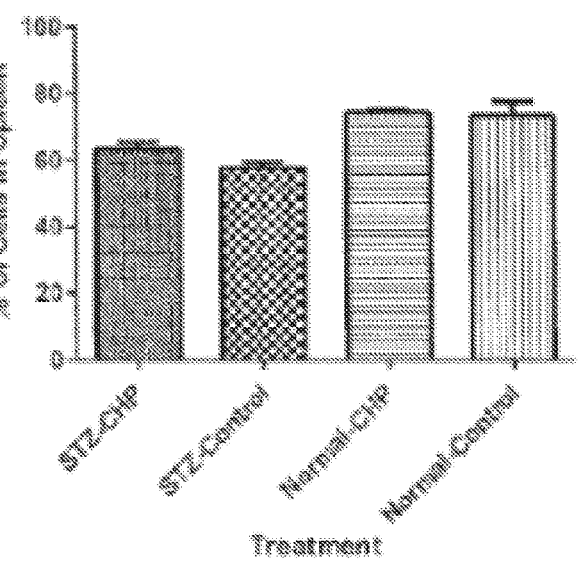
FIG. 2C FACS analysis of $CD3^+$ $CD4^+$ Helper T-cell population in spleen after four months of treatment (six months old). Test subjects in each group were sacrificed. For each individual test subject, the spleen was collected and analyzed for $CD3^+$ $CD4^+$ T-cell levels, and the mean±SEM of each group was plotted in FIG. 2C. $*p<0.05$ in comparison to untreated control for each group, diabetic or normal.

CD4 is a glycoprotein found on the surface of T helper cells, monocytes, macrophages, and dendritic cells, as discussed in "CD4(+) T-cell subsets in intestinal inflammation," by Shale et al., Immunol. Rev. 252:164-182 (2013), which is hereby incorporated herein by reference. It is a co-receptor that assists the T-cell receptor (TCR) in communicating with an antigen-presenting cell. CD4 transfers the signal from TCR to the tyrosine kinase Lck, which initiates a signaling cascade, resulting in the production of various types of T-helper cells. To analyze the various T-lymphocyte subpopulations, FACS was used to first identify the $CD3^+$ T-lymphocyte population. Then, the percentage of $CD4^+$ and $CD8^+$ T-cell subsets within that population were determined. The level of $CD3^+$ $CD4^+$ T-lymphocytes was approximately 60% over the entire time course (three to five months old), regardless of the health of the test subjects (FIG. 2A). The tendency was a slight decrease in levels with treatment in the diabetic test subjects and a slight increase in the normal non-diabetic test subjects. In the individual test subjects samples (FIG. 2B), Cyclo-Z treatment had a tendency to slightly decrease $CD3^+$ $CD4^+$ T-lymphocytes in the blood of diabetic test subjects (p=0.2286), while significantly increasing $CD3^+$ $CD4^+$ T-cells in normal test subjects (p=0.0028). In the spleens, $CD3^+$ $CD4^+$ numbers were unchanged with Cyclo-Z treatment in both diabetic (p=0.1143) and normal (p=0.9384) test subjects (FIG. 2C).

T helper cells ($T_h$ cells) are a type of T-cell that plays an important role in the immune system, and, particularly, in the adaptive immune system. $T_h$ cells help the activity of other immune cells by releasing T-cell cytokines, and help suppress or regulate immune responses. They are essential in B-cell antibody class switching, in the activation and growth of cytotoxic T-cells, and in maximizing bactericidal activity of phagocytes, such s macrophages. In general, Cyclo-Z treatment increased blood T-cells CD4 in normal test subjects. However, in STZ-treated test subjects, Cyclo-Z suppressed CD4 expression. These data also indicate that Cyclo-Z treatment modulates CD4 expression depending on the physiological conditions of the subject.

5.3. T-Cells Subset CD8

The CD8 antigen is a glycoprotein predominantly expressed on cytotoxic T-cells and can differentiate into two effector phenotypes, Tc1 and Tc2, secreting different cytokine patterns and having diverse functions including cytotoxicity for infected cells or an immune system suppressive effect as determined by the cytokine expression pattern, as discussed in "Functions of CD8 T-cell subsets secreting different cytokine patterns," by Mosmann et al., Semin. Immunol. 9:87-92 (1997), which is hereby incorporated herein by reference. Adoptive transfer of $CD8^+$ T-cells with these phenotypes may have a role in the therapy of infectious disease and/or cancer, as discussed in "Tc17 CD8 T cells: functional plasticity and subset diversity," by Yen et al., J. Immunol. 183:7161-7168 (2009), which is hereby incorporated herein by reference.

Figure 3A:
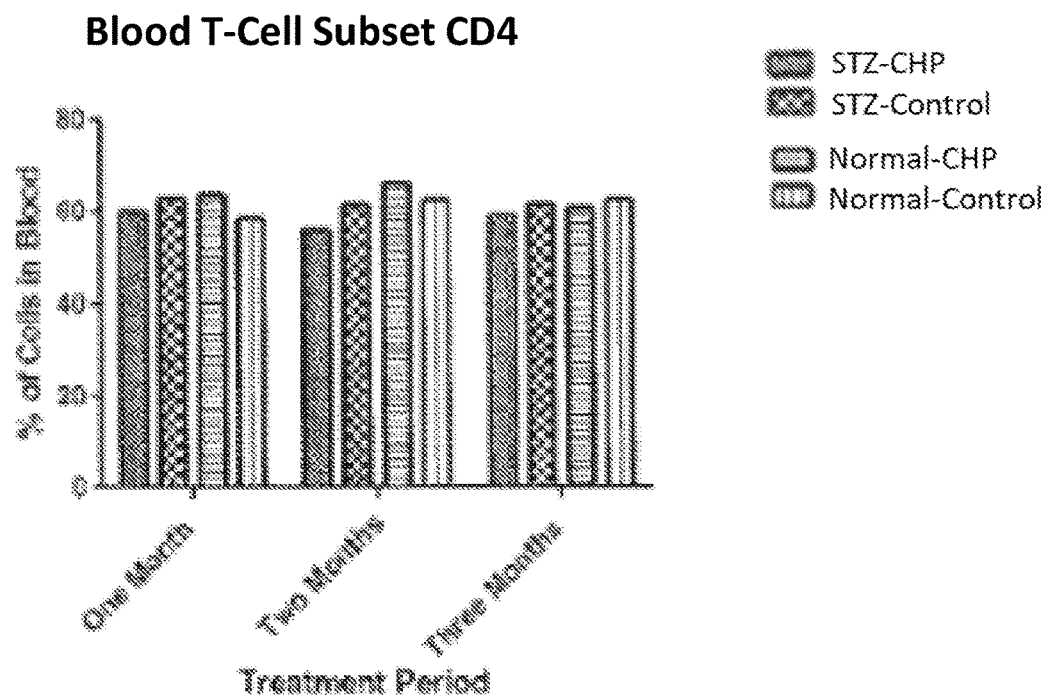
FIG. 3A. FACS analysis of $CD3^+$ $CD8^+$ Cytotoxic T-cell population in blood over three-month time course. Analysis of the same blood samples used in FIG. 1A. Blood was pooled for like groups, prior to FACS analysis for $CD3^+$ CD8 T-cell levels.
Figure 3B:
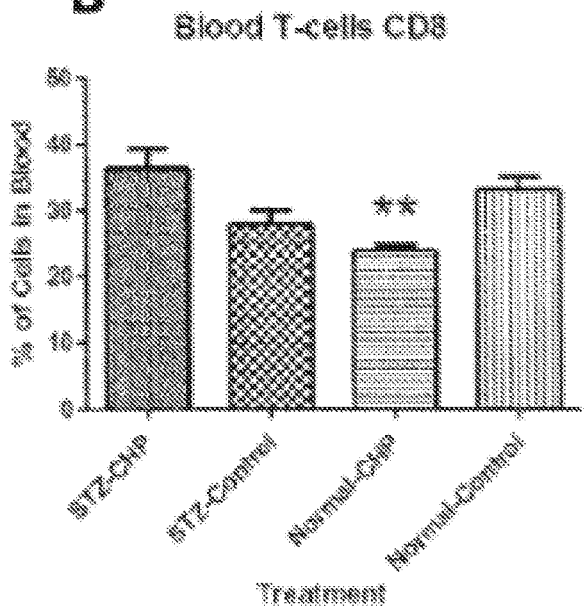
FIG. 3B. FACS analysis of $CD3^+$ $CD8^+$ Cytotoxic T-cell population in blood after four months of treatment (six months old). Test subjects in each group were sacrificed. For each individual test subject, blood was collected and analyzed for $CD3^+$ $CD8^+$ T-cell levels, and the mean±SEM of each group was plotted in FIG. 3B.
Figure 3C:
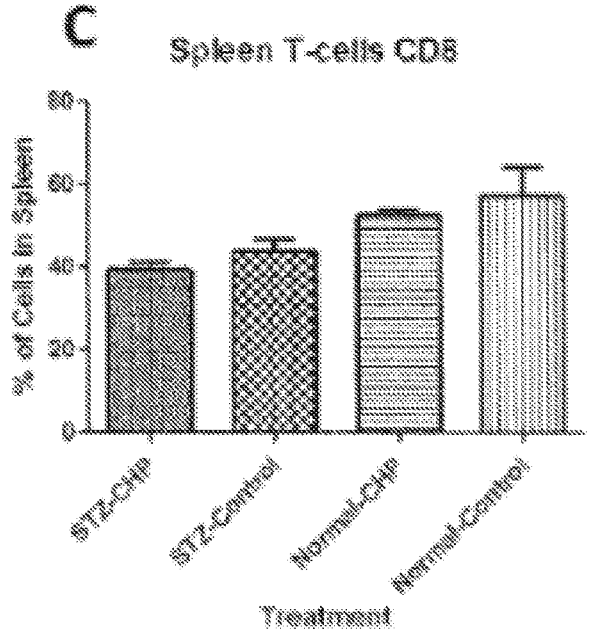
FIG. 3C. FACS analysis of $CD3^+$ CD8 Cytotoxic T-cell population in spleen after four months of treatment (six months old). Test subjects in each group were sacrificed. For each individual test subject, the spleen was collected and analyzed for $CD3^+$ $CD8^+$ T-cell levels, and the mean±SEM of each group was plotted in FIG. 3C. $*p<0.05$ in comparison to untreated control for each group, diabetic or normal.

Similarly to the $CD4^+$ subset, the percentage of $CD3^+$ $CD8^+$ T-cells was relatively constant at 35-40% regardless of age or health. Over the time course, the tendency was for Cyclo-Z treatment to slightly increase levels of $CD3^+$ $CD8^+$ T-cells in diabetic test subjects and to decrease levels in non-diabetic test subjects (FIG. 3A). In the individual test-subject blood data, Cyclo-Z treatment (four months) tended to increased levels of $CD3^+$ $CD8^+$ T-cells in diabetic test subjects (p=0.1143), while significantly decreasing (p=0.0056) levels in non-diabetic normal test subjects (FIG. 3B). Similarly to $CD3^+$ $CD4^+$ numbers in the spleen, $CD3^+$ $CD8^+$ levels in spleen cells were not significantly altered with Cyclo-Z treatment in diabetic or normal test subjects (FIG. 3C).

$CD8^-$ T-cells (or killer T-cells) are a subset of T lymphocytes (a type of white blood cell) that attack cancer cells, infected cells (particularly, cells infected with viruses), or cells that are damaged in other ways. Normal test subjects, treated with Cyclo-Z, have significantly reduced numbers of CD8 cells, whereas STZ-treated diabetic test subjects, treated with Cyclo-Z, have increased numbers of CD8 cells. These data indicate that CD8 cell levels are elevated with Cyclo-Z treatment in diseased subjects, but not in normal subjects.

Expression levels of RT1B and CD25 were also analyzed to look at activation states of the T-lymphocytes. To analyze activated populations, FACS was used to first identify the $CD3^+$ T-lymphocyte population. Then, the percentage of $RT1B^+$ or $CD25^+$ cells within that population was determined.

5.4. T-cells Activated RT1B

RT1B is a membrane glycoprotein that is used as a marker of thymocyte-activated immune stimulation. It is present on some T- and B-lymphocytes, dendritic cells, some macrophages, and certain epithelial cells, as discussed in "Identification of Ia glycoproteins in rat thymus and purification from rat spleen," by McMaster et al., Eur. J. Immunol. 9:426-433 (1979), and "Two-domain MHC class II molecules from stable complexes with myelin basic protein 69-89 peptide that detect and inhibit rat encephalitogenic T-cells and treat experimental autoimmune encephalomyelitis," by Burrows et al., J. Immunol. 161:5987-5996 (1998), each of which is hereby incorporated herein by reference.

CD3 $RT1B^+$ T-cell activation increased with age (three to four months) over the time course in both normal non-diabetic and diabetic blood (FIG. 4A), with or without Cyclo-Z treatment. At all time points, the trend was for Cyclo-Z treatment to increase $CD3^+$ $RT1B^+$ T-cell numbers in both diabetic and non-diabetic test subjects. In the diabetic test subjects, the magnitude of change between Cyclo-Z-treated and non-treated test subjects was greatest at the youngest time points (two and three months old) and actually decreased at the five-month-old time point (three months of treatment). For the individual blood data at six months of age (four months treatment), no significant differences were seen, with or without Cyclo-Z treatment. However, the diabetic blood had overall greater numbers of $CD3^+$ $RT1B^+$ T-cells (FIG. 4B). In the spleen, results were reversed with non-diabetic treated test subjects having significantly greater numbers (p=0.0286) of $CD3^+$ $RT1B^+$ T-cells than the diabetic treated test subjects (FIG. 4C). The trend was for decreased numbers of $CD3^+$ $RT1B^+$ T-cells in diabetic test subjects' spleens (p=0.0571) and significantly increased levels of activated T-cells in normal test subjects' spleens (p=0.0336) with Cyclo-Z treatment.

RT1B is a membrane glycoprotein that is used as a marker of thymocyte-activated immune stimulation. It is present on some T-lymphocytes and B-lymphocytes, dendritic cells, some macrophages, and certain epithelial cells. In normal cells from healthy subjects, RT1B-activated T-cell populations did not increase in the blood, but were significantly increased in the spleen. However, in the STZ-induced diabetic test subjects, RT1B-activated T-cell populations significantly increased in young (one to two months old) test subjects, but decreased in the blood and spleens of older (three to four months old) test subjects. These data indicate that, in healthy subjects, Cyclo-Z treatment increases the levels of activated immune cells in the spleen, but does not release the activated immune cells to the blood stream prior to injury (chemical or infectious organisms). In the diabetic test subjects, STZ-induced injury of the pancreas may have caused the release of immune cells from the pancreas into the blood, as demonstrated by the increased levels of $RT1B^+$ T-cells in the blood and the decreased levels of $RT1B^+$ in the spleens of the STZ-induced diabetic test subjects relative to the normal test subjects. Cyclo-Z treatment helps to normalize the levels of RT1B⁺ cell levels in diabetic subjects—increasing levels in the spleen and decreasing levels in the blood.

5.5. T-Cells Activated CD25

CD25 interacts with CD122 to form a heterodimer and serves as a high-affinity receptor of IL-2. It is a type I transmembrane protein present on activated T-cells, activated B-cells, some thymocytes, myeloid precursors, and oligodendrocytes. In mice, it has been used as a marker of $CD4^+ FoxP3^+$ helper T-cells (also known as regulatory $T_{regs}$) and has been identified on the majority of resting memory T-cells in humans, as discussed in "Defining a functionally distinct subset of human memory $CD4^+$ T-cells that are CD25POS and FOXP3NEG," by Triplett et al., Eur. K. Immunol. 42:1893-1905 (2012), which is hereby incorporated herein by reference. Based on in vitro studies, IL-2 is considered a key growth and death factor for antigen-activated T-lymphocytes, as discussed in "The main function of IL-2 is to promote the development of T Regulatory cells," by Malek, J. Leukoc. Biol. 74:961-965 (2003), which is hereby incorporated herein by reference.

Figure 5A:
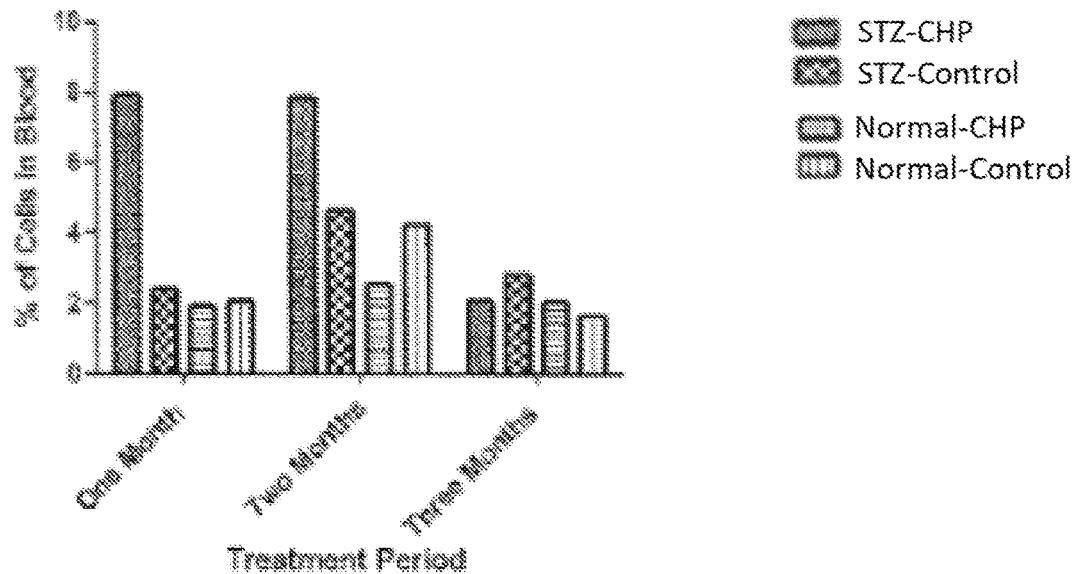
FIG. 5A. FACS analysis of $CD3^+$ $CD25^+$ Activated T-cell population in blood over three-month time course. Analysis of the same blood samples used in FIG. 1A. Blood was pooled for like groups, prior to FACS analysis for $CD3^+$ $CD25^+$ T-cell levels.

The results for relative $CD3^+ CD25^+$ T-lymphocytes levels were very similar to that of activated $CD3^+ RT1B^+$ T-cells. In STZ-diabetic rats, $CD3^+ CD25^+$ cell levels were increased at the age of three and four months, compared to controls, when treated with Cyclo-Z (one and two months of treatment, respectively), but decreased at the age of five months (three months of treatment) and were less than the non-treated control group (FIG. 5A).

Figure 4C:
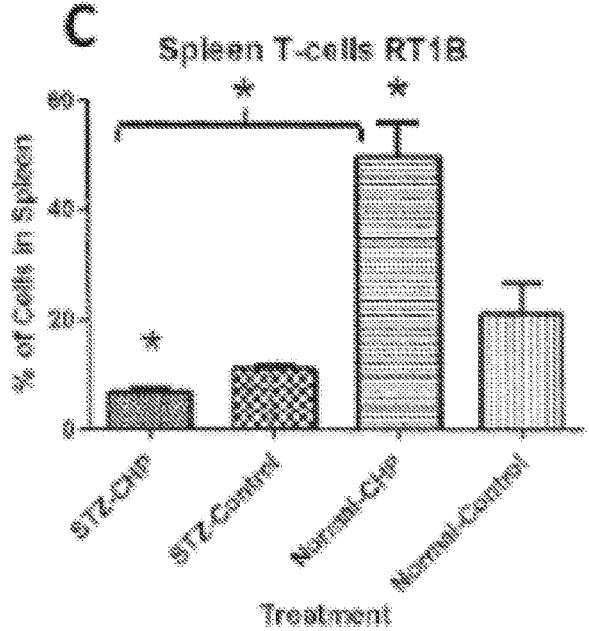
FIG. 4C. FACS analysis of $CD3^+$ $RTIB^+$ Activated T-cell population in spleen after four months of treatment (six months old). Test subjects in each group were sacrificed. For each individual test subject, the spleen was collected and analyzed for $CD3^+$ $RTIB^+$ T-cell levels, and the mean±SEM of each group was plotted in FIG. 4C.
Figure 5B:
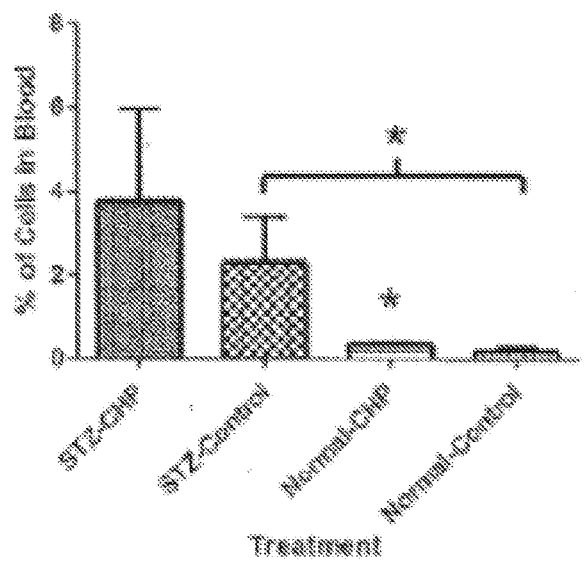
FIG. 5B. FACS analysis of $CD3^+$ $CD25^+$ Activated T-cell population in blood after four months of treatment (six months old). Test subjects in each group were sacrificed. For each individual test subject, blood was collected and analyzed for $CD3^+$ $CD25^+$ T-cell levels, and the mean±SEM of each group was plotted in FIG. 5B.
Figure 5C:
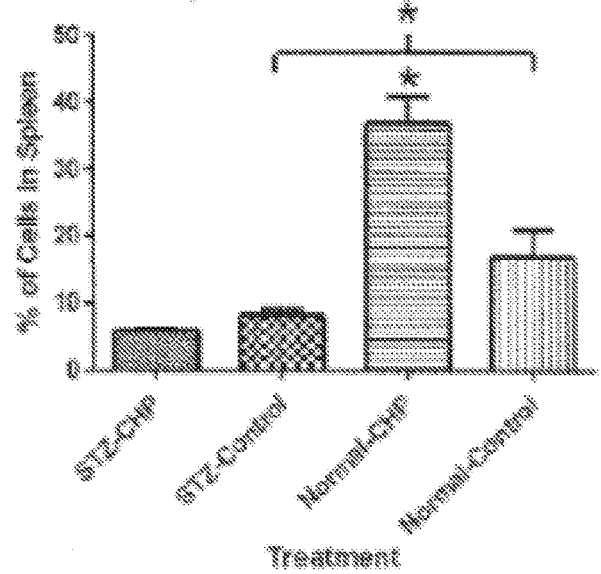
FIG. 5C. FACS analysis of $CD3^+$ $CD25^+$ Activated T-cell population in spleen after four months of treatment (six months old). Test subjects in each group were sacrificed. For each individual test subject, the spleen was collected and analyzed for $CD3^+$ $CD25^+$ T-cell levels, and the mean±SEM of each group was plotted in FIG. 5C. $*p<0.05$ in comparison to untreated control for each group, diabetic or normal.

Similarly to the $CD3^+ RT1B^+$ cell levels in the older (six months old) diabetic test subjects' blood, STZ-untreated diabetic test subjects had significantly (p=0.0182) increased $CD3^+ CD25^+$ T-cell levels compared to untreated normal test subjects (FIG. 5B). Treatment with Cyclo-Z tended to slightly increase, but not significantly, $CD3^+ CD25^+$ T-cell levels in the blood of STZ-diabetic test subjects (p=0.8571). In normal non-diabetic test subjects, $CD3^+ CD25^+$ levels were significantly increased with Cyclo-Z treatment. Similarly to the $CD3^+ RT1B^+$ data (FIG. 4C), normal test subjects' spleens had significantly higher levels (p=0.0336) of activated $CD3^+ CD25^+$ cells compared to the STZ-diabetic test subjects. Furthermore, Cyclo-Z treatment significantly increased $CD3^+ CD25^-$ T-cells levels in normal test subjects (p=0.0336), but not in diabetic (p=0.1143) test subjects (FIG. 5C).

The results for the $CD3^+ RT1B^+$ and $CD3^+ CD25^+$ cell numbers indicate that both diabetic condition and age affect T-cell activation state in the blood and spleen. Cyclo-Z treatment is effective in stimulating T-cell activation in the blood of both younger diabetic and normal test subjects and in the blood and spleen of older normal test subjects.

Regulatory T-cells come in many forms. The most well-studied regulatory T-cells are those that express CD4, CD25, and FOXP3 ($CD4^+ CD25^+$ regulatory T-cells). Regulatory T-cells are involved in shutting down the immune responses after they have successfully eliminated invading organisms, and in preventing autoimmunity. In general, Cyclo-Z treatment in STZ-treated test subjects increased $CD25^+$ cell levels in the blood, while Cyclo-Z treatment in normal test subjects decreased $CD25^+$ cell levels in the blood. However, in the spleens of normal test subjects, Cyclo-Z significantly increased $CD25^+$ cells, whereas, in the spleens of STZ-treated test subjects, Cyclo-Z decreased $CD25^+$ T-cells. These data indicate that Cyclo-Z treatment may enhance regulatory T-cell activities in blood in cases of chemical injury or invasion of infectious organisms.

5.6 Antigen-Presenting Cells CD86

Cluster of Differentiation 86 (also known as CD86 and B7-2) is a protein expressed on AP cells that provides co-stimulatory signals necessary for T-cell activation and survival. The CD86 gene encodes a type I membrane protein that is a member of the immunoglobulin superfamily, as discussed in "Molecular cloning and expression of early T-cell costimulatory molecule-1 and its characteristic as B7-2 molecule," by Chen et al., J. Immunol. 152:4929-4936 (1994), which is hereby incorporated herein by reference. CD86 works in tandem with CD80 to prime T-cells.

Figure 6A:
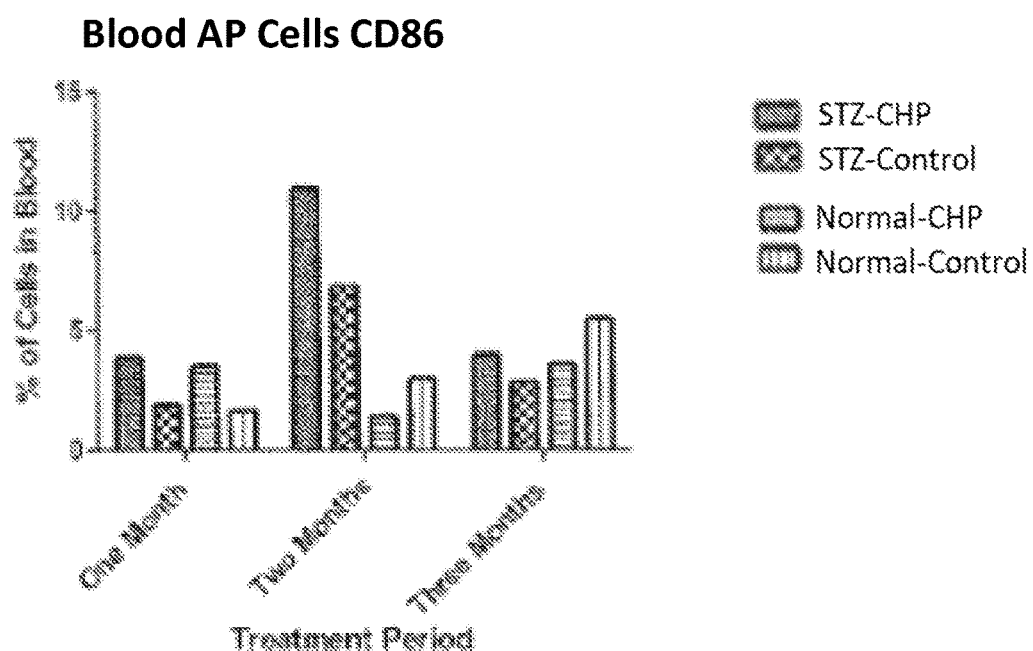
FIG. 6A. FACS analysis of $CD86^+$ Antigen-Presenting (AP) cell population in blood over three-month time course. Analysis of the same blood samples used in FIG. 1A. Blood was pooled for like groups, prior to FACS analysis for $CD86^+$ AP cell levels.
Figure 6B:
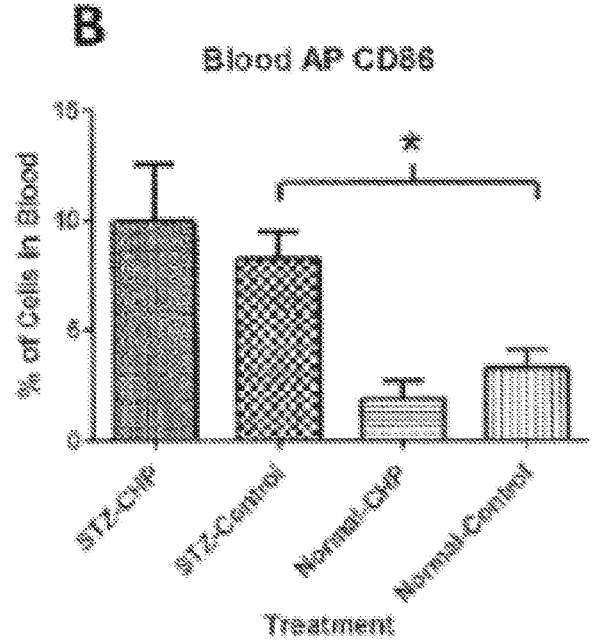
FIG. 6B. FACS analysis of $CD86^+$ AP cell population in blood after four months of treatment (six months old). Test subjects in each group were sacrificed. For each individual test subject, blood was collected and analyzed for $CD86^+$ AP cell levels, and the mean±SEM of each group was plotted in FIG. 6B.
Figure 6C:
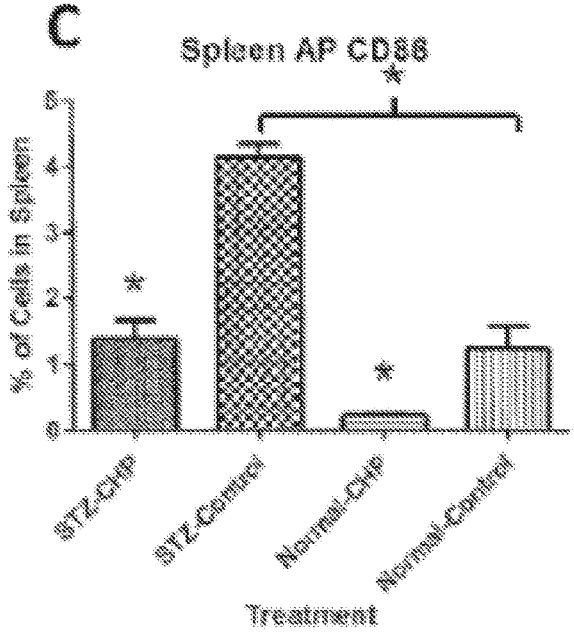
FIG. 6C. FACS analysis of $CD86^+$ AP cell population in spleen after four months of treatment (six months old). Test subjects in each group were sacrificed. For each individual test subject, the spleen was collected and analyzed for $CD86^+$ AP cell levels, and the mean±SEM of each group was plotted in FIG. 6C. $*p<0.05$ in comparison to untreated control for each group, diabetic or normal.

$CD86^+$ AP cell numbers were stimulated by Cyclo-Z treatment at all time points in diabetic test subjects (FIG. 6A). Normal test subjects' $CD86^+$ AP cell numbers increased at only the earliest time point (three months old, one month of treatment) and were decreased at the later two time points (four and five months old). In the six-month-old individual blood and spleen data, $CD86^+$ AP cell numbers in the diabetic untreated test subjects were significantly increased (p=0.0286 for blood, p=0.0091 for spleen), compared to normal untreated test subjects (FIG. 6B). Cyclo-Z treatment in diabetic or normal test subjects did not significantly affect $CD86^+$ AP cell numbers in the blood. Although, the trend was for increased levels in diabetic and decreased levels in normal blood. In the spleen, Cyclo-Z treatment significantly decreased levels in both diabetic test subjects (p=0.05) and normal (p=0.0443) test subjects (FIG. 6C).

CD86 is a protein expressed on AP cells that provides costimulatory signals necessary for T-cell activation and survival. In normal test subjects, Cyclo-Z treatment reduced CD86 expression, other than in the first month, both in the blood and spleen. In contrast, in STZ-treated diabetic test subjects, Cyclo-Z treatment increased CD86 expression in the blood, but depressed CD86 expression in the spleen. Thus, Cyclo-Z may stimulate the release of $CD86^+$ AP cells from the spleen into the blood to protect against invasive foreign organisms.

5.7. Anti Gen-Presenting Cells CD80

Cluster of Differentiation 80 (CD80) is a protein found on activated B-cells and monocytes that provides a co-stimulatory signal necessary for T-cell activation and survival, as discussed in "Both extracellular immunogoblin-like domains of CD80 contain residues critical for binding T-cell surface receptors CTLA-4 and CD28," by Peach et al., J. Biol. Chem. 270:21181-21187 (1995), which is hereby incorporated herein by reference. CD80 works in tandem with CD86 to prime T-cells.

Figure 7A:
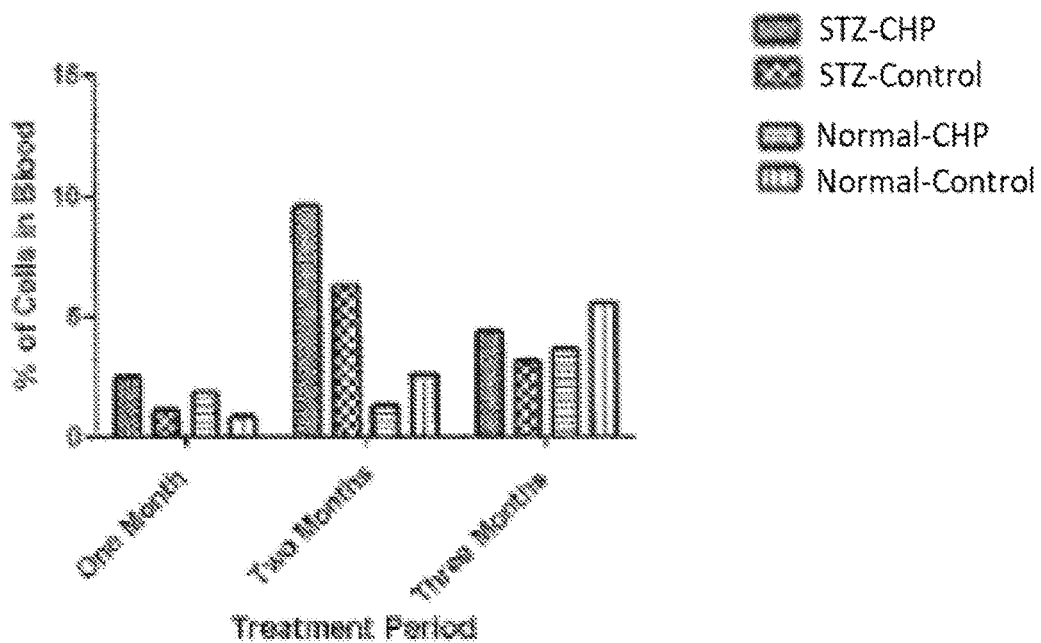
FIG. 7A. FACS analysis of $CD80^+$ AP cell population in blood over three-month time course. Analysis of the same blood samples used in FIG. 1A. Blood was pooled for like groups, prior to FACS analysis for $CD80^+$ AP cell levels.
Figure 7B:
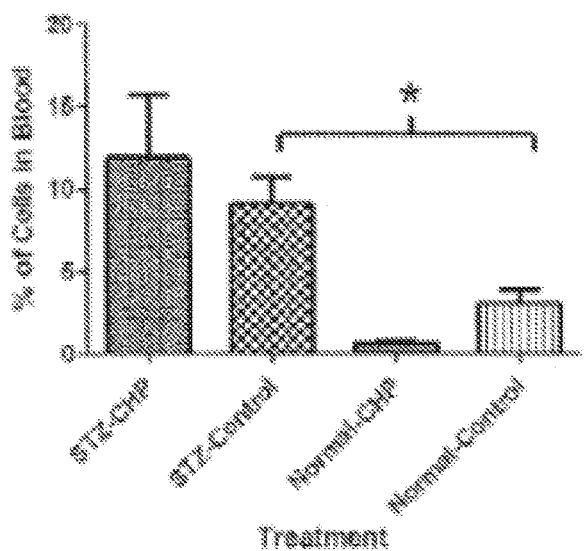
FIG. 7B. FACS analysis of $CD80^+$ AP cell population in blood after four months of treatment (six months old). Test subjects in each group were sacrificed. For each individual test subject, blood was collected and analyzed for $CD80^+$ AP cell levels, and the mean±SEM of each group was plotted in FIG. 7B.
Figure 7C:
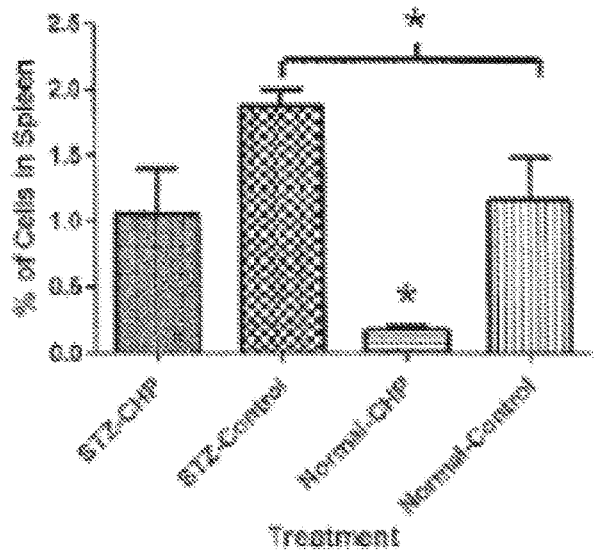
FIG. 7C. FACS analysis of $CD80^+$ AP cell population in spleen after four months of treatment (six months old). Test subjects in each group were sacrificed. For each individual test subject, the spleen was collected and analyzed for $CD80^+$ AP cell levels, and the mean±SEM of each group was plotted in FIG. 7C. $*p<0.05$ in comparison to untreated control for each group, diabetic or normal.

Similarly to CD86 data, $CD80^+$ AP cell numbers were stimulated by Cyclo-Z treatment at all time points in diabetic test subjects and in the earliest time point (three months old, one month of treatment) in normal test subjects, but decreased with Cyclo-Z treatment in normal test subjects at the latter two time points (FIG. 7A). At six months of age, the individual blood and spleen data trends mirrored that seen for the $CD86^+$ cell levels: increased $CD80^+$ cell numbers in diabetic test subjects in relation to normal test subjects (p=0.0182 for blood, p×0.0286 for spleen); slightly increased $CD80^+$ AP cell levels in diabetic blood with Cyclo-Z treatment; slightly decreased $CD80^+$ AP cell levels in non-diabetic blood with Cyclo-Z treatment; slightly reduced numbers in diabetic spleen; and significantly decreased $CD80^+$ AP cell levels (p=0.0196) in normal non-diabetic spleen (FIGS. 7B and 7C).

These data demonstrate that Cyclo-Z can regulate AP cell activity. These results, similarly to the CD3 data, suggest that when the immune system is not fully developed (young subjects), Cyclo-Z is effective in stimulating immunity in both diabetic and normal subjects. However, in fully developed subjects, Cyclo-Z may modulate and lead to lower normal adequate levels in healthy subjects while continuing to stimulate the immune system in fully developed diabetic subjects.

Although CD80 and CD86 are both expressed on monocytes, they seem to have different functions, since they are expressed differentially on distinct subsets of monocytes. Freshly isolated monocytes express CD86, but are CD80-negative. CD80 expression is weakly induced after six to eight hours of in vitro culture and is enhanced by stimulation with antigens. In studies, both CD86 and CD80 showed similar expression patterns and modulation, with Cyclo-Z treatment, in both normal and diabetic test subjects.

5.8. B-Cells CD45RA

CD45 antigen is involved in the activation, proliferation, and differentiation of human T- and B-lymphocytes, as discussed in "The role of CD45RA on human B-Cell function: anti-CD45RA antibody (anti-2H4) inhibits the activation of resting B cells and antibody production of activated B cells independently in human," by Morikawa et al., Scand. J. Immunol. 34:273-283 (1991), which is hereby incorporated herein by reference. It is a member of the Protein Tyrosine Phosphatase (PTP) family and found on all types of hematopoietic stem cells in various isoforms. These different CD45 isoforms can be used to distinguish between naïve and memory T-cells, as discussed in "Human B cells express a CD45 isoform that is similar to murine B220 and is down regulated with acquisition of the memory B cell marker CD27," by Blessing et al., Cytometry B. Clin. Cytom. 51:1-8 (2003), and "Dual personality of memory T cells," by Mackay, Nature 401:659-660 (1999), each of which is hereby incorporated herein by reference. CD45RA is a high molecular weight form of CD45 found only on B-lymphocytes. It is present on the surface of more than 95% of B-lymphocytes in purified tonsillar B-cell preparations, as discussed in "The role of CD45 in the activation, proliferation and differentiation of human lymphocytes," by Morikawa et al., Int. J. Hematol. 54:495-504 (1991), which is hereby incorporated herein by reference. Anti-CD45RA antibody also had a suppressive effect on the early phase of B-cell differentiation and is directly involved in the regulatory function of B-cells, as discussed in "The role of CD45RA on human B-cell function: Anti-CD45RA antibody (anti-2H4) inhibits the activation of resting B-cells and antibody production of activated B-cells independently in humans," by Morikawa et al., Scand. J. Immunol. 34:273-283 (1991), which is hereby incorporated herein by reference. Two antibodies were used for FACS analysis of B-cell CD45RA protein expression, conjugated with either fluorescein isothiocyanate (FITC) or Phycoerythrin (PE). Similar results were obtained with both of the antibodies.

Figure 8A:
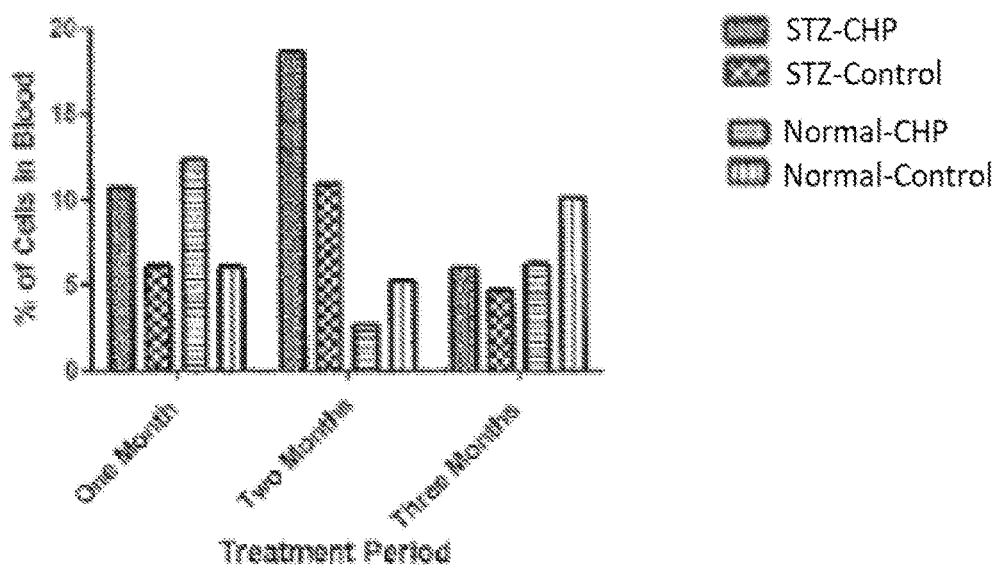
FIG. 8A. FACS analysis of $CD45RA^+$ B-cell population in blood over three-month time course. Analysis of the same blood samples used in FIG. 1A. Blood was pooled for like groups, prior to FACS analysis for CD45RA$^+$ B-cell levels.
Figure 8B:
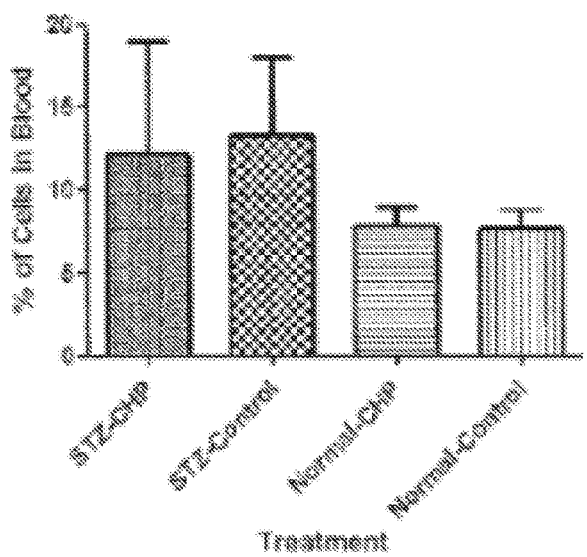
FIG. 8B. FACS analysis of CD45RA$^+$ B-cell population in blood after four months of treatment (six months old). Test subjects in each group were sacrificed. For each individual test subject, blood was collected and analyzed for CD45RA$^+$ B-cell levels, and the mean±SEM of each group was plotted in FIG. 8B.
Figure 8C:
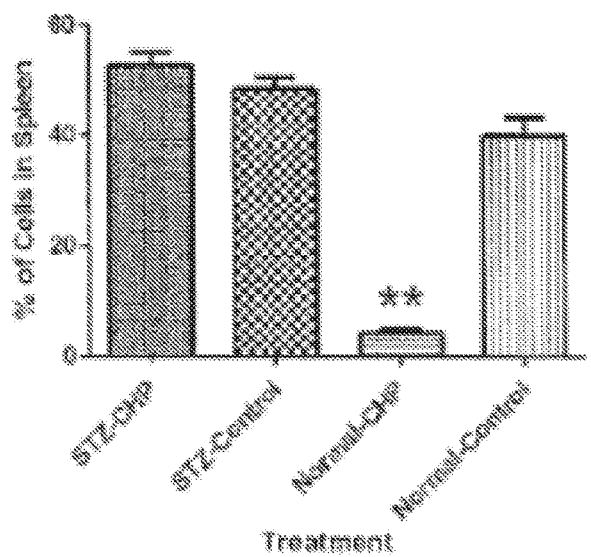
FIG. 8C. FACS analysis of CD45RA$^+$ B-cell population in spleen after four months of treatment (six months old). Test subjects in each group were sacrificed. For each individual test subject, the spleen was collected and analyzed for CD45RA$^+$ B-cell levels, and the mean±SEM of each group was plotted in FIG. 8C. *$p<0.05$ in comparison to untreated control for each group, diabetic or normal.

As shown in FIG. 8A, Cyclo-Z treatment resulted in increased numbers of CD45RA$^+$ cells in the blood of diabetic test subjects at each time point. The magnitude of the effect was greater in younger subjects (three and four months old, one or two months of treatment) and diminished at the later time point (five months old, three months of treatment). In healthy non-diabetic test subjects, the CD45RA$^+$ cell numbers increased in the youngest subjects (three months old) but decreased in older subjects (four and five months old) with Cyclo-Z treatment. For the older individual test subjects' data (FIG. 8B; six months old, four months of treatment), the levels of CD45RA$^+$ B-cells in the blood were elevated in STZ-diabetic test subjects, compared to healthy test subjects. Treatment with Cyclo-Z did not significantly affect levels of CD45RA$^+$ B-cells in the blood of diabetic or normal subjects. However, in the spleen, the levels of CD45RA$^+$ B-cells were significantly decreased (p=0028) when normal subjects were treated with Cyclo-Z (FIG. 8C). These data suggest that Cyclo-Z has a significant effect on spleen CD45RA$^+$ B-cell populations, depending on the health state of the subject.

CD45RA is expressed on B-cells, as well as the effector cells in both CD4 and CD8 T-cell subsets. In normal test subjects, Cyclo-Z treatment suppressed CD45RA$^+$ B-cells, other than in the first month, but very significantly suppressed B-cell levels in the spleen. On the other hand, Cyclo-Z treatment generally increased CD45RA$^+$ B-cells in STZ-induced diabetic test subjects. These results suggest that Cyclo-Z treatment stimulates B-cell activation, which would aid in the removal of foreign bodies.

5.9. Natural Killer CD161A

NK cells are large granular lymphocytes, producing inflammatory cytokines, which kill malignant, infected, or abnormal cells, as discussed in "Developmental pathways that generate natural killer cell diversity in mice and humans," by Huntington et al., Nature Rev. Immunol. 7:703-714 (2007), which is hereby incorporated herein by reference. NK activation is tightly controlled by cell surface receptors receiving both stimulatory and inhibitory signals. CD161A is a 60 kDa protein expressed on all NK cells and a small subset of T-lymphocytes. Two populations of CD161A$^+$ cells were labelled with the CD161A antibody. The pattern of CD161A$^+$ cell expression was very similar within both populations.

5.9.1. NK Cells Large Population

Figure 9A:
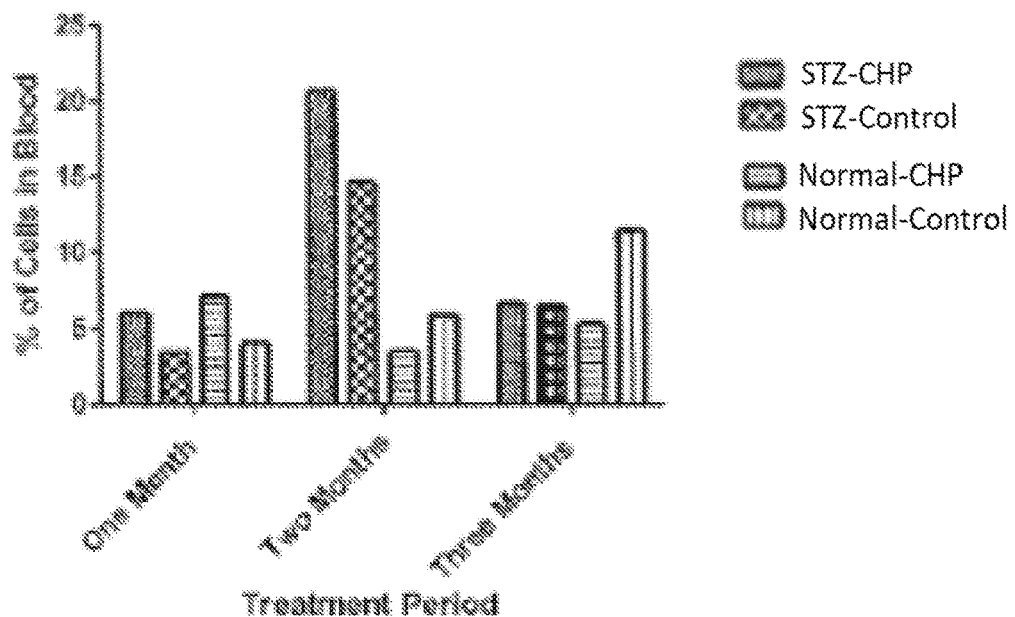
FIG. 9A. FACS analysis of CD161A$^+$ Natural Killer (NK) cell large population in blood over three-month time course. Analysis of the same blood samples used in FIG. 1A. Blood was pooled for like groups, prior to FACS analysis for CD161A$^+$ NK cell levels.
Figure 9B:
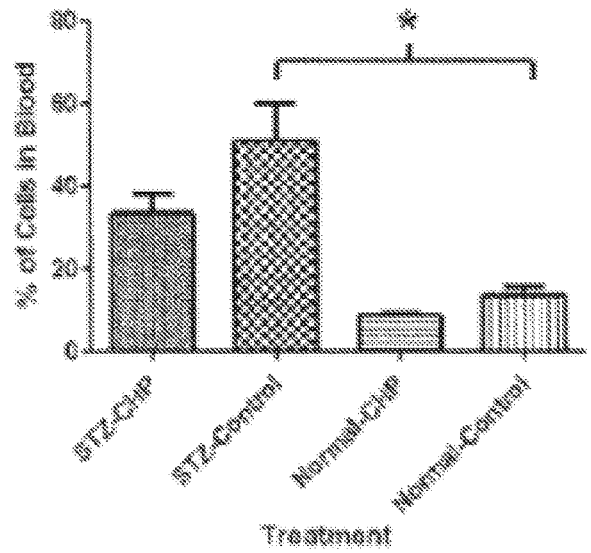
FIG. 9B. FACS analysis of CD161A$^+$ NK cell large population in blood after four months of treatment (six months old). Test subjects in each group were sacrificed. For each individual test subject, blood was collected and analyzed for CD161A$^+$ NK cell levels, and the mean±SEM of each group was plotted in FIG. 9B.
Figure 9C:
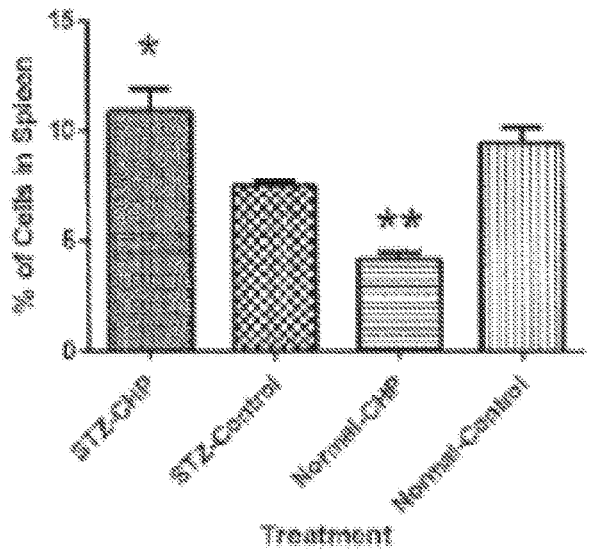
FIG. 9C. FACS analysis of CD161A$^+$ NK cell large population in spleen after four months of treatment (six months old). Test subjects in each group were sacrificed. For each individual test subject, the spleen was collected and analyzed for CD161A$^+$ NK cell levels, and the mean±SEM of each group was plotted in FIG. 9C. *$p<0.05$ in comparison to untreated control for each group, diabetic or normal.

In STZ-induced diabetic test subjects, the CD161A$^+$ population increased with Cyclo-Z treatment at the first two time points (three and four months old, one and two months of treatment), but was unchanged or decreased at the five-months-old time point (FIG. 9A). However, in healthy subjects treated with Cyclo-Z, the CD161A$^+$ cell population increased at one month of treatment and then decreased after two or three months of treatment, in comparison to untreated subjects. For the individual subjects' blood and spleen data (six months old), CD161A$^+$ NK cell levels in diabetic subjects were significantly higher (p=0.0091) than in normal subjects' blood (FIG. 9B). Cyclo-Z treatment (four months of treatment) did not significantly affect the number of CD161A$^+$ NK cells in either diabetic or normal blood. However, the trend was decreased numbers of CD161A$^+$ NK cells with Cyclo-Z treatment (FIG. 9B). There was a significant increase in CD161A$^+$ spleen cells in diabetic subjects (p=0.05) and a significant decrease (p=0.0028) in CD161A$^+$ NK cells in the spleen of normal subjects with Cyclo-Z treatment (FIG. 9C).

Thus, these data suggest that Cyclo-Z treatment also has a modulatory effect on CD161A$^+$ NK numbers by increasing the immune reaction in young diabetic or normal subjects and possibly acting to modulate inflammatory reactions in older non-diabetic subjects.

5.9.2. NK Cells Small Population

Figure 10A:
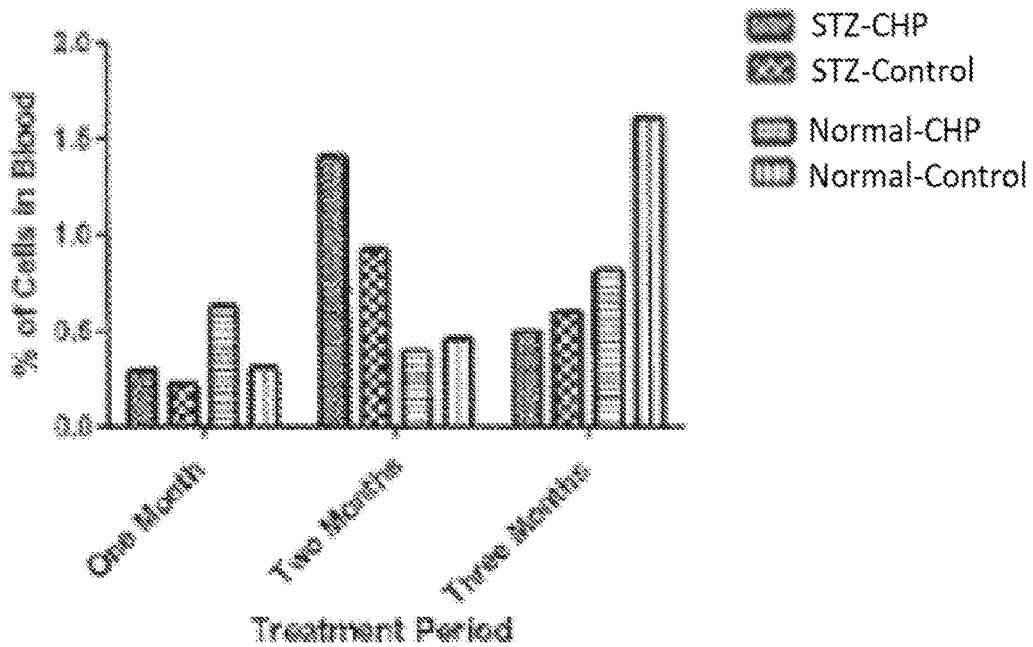
FIG. 10A. FACS analysis of CD161A$^+$ NK cell small population in blood over three-month time course. Analysis of the same blood samples used in FIG. 1A. Blood was pooled for like groups, prior to FACS analysis for CD161A$^+$ NK cell levels.
Figure 10B:
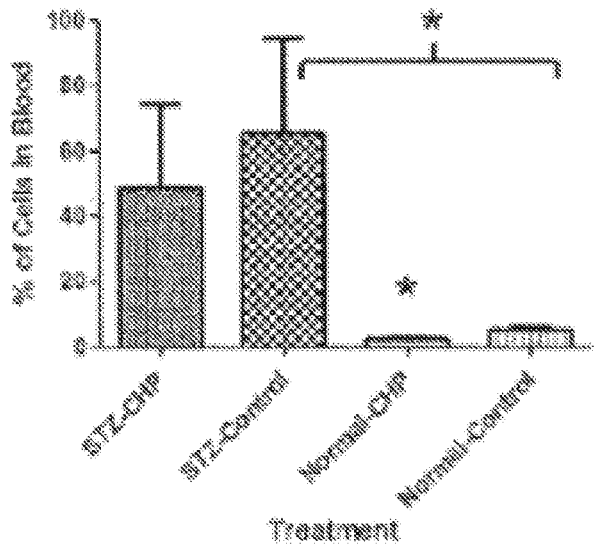
FIG. 10B. FACS analysis of CD161A$^+$ NK cell small population in blood after four months of treatment (six months old). Test subjects in each group were sacrificed. For each individual test subject, blood was collected and analyzed for CD161A$^+$ NK cell levels, and the mean±SEM of each group was plotted in FIG. 9B.
Figure 10C:
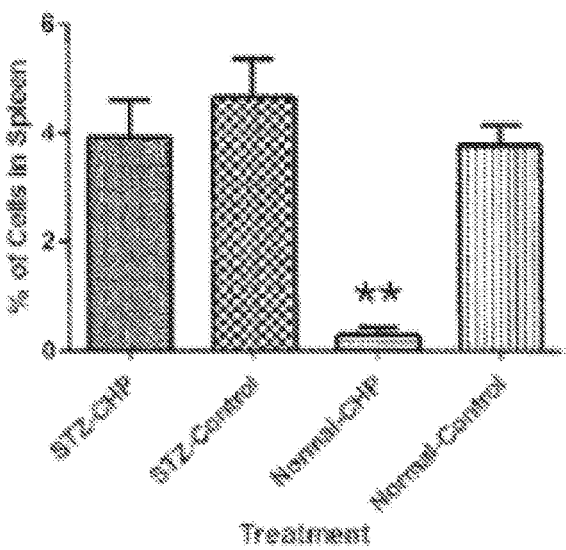
FIG. 10C. FACS analysis of CD161A$^+$ NK cell small population in spleen after four months of treatment (six months old). Test subjects in each group were sacrificed. For each individual test subject, the spleen was collected and analyzed for CD161A$^+$ NK cell levels, and the mean±SEM of each group was plotted in FIG. 9C. *$p<0.05$ in comparison to untreated control for each group, diabetic or normal.

The second smaller CD161A$^+$ population acted in a similar manner as the larger cell population in response to Cyclo-Z treatment in both diabetic and normal subjects (FIGS. 10A-10C). These data again indicate that Cyclo-Z treatment may function to modulate the immune system in older subjects and may be potentially beneficial for the treatment of both immune deficiency and inflammation.

The NK CD161A$^+$ small population also showed similar effects as NK CD161A$^+$ large population results shown in FIGS. 9A-C.

CD161 (human NKR-P1A) is a major phenotypic marker in the NK gene complex and is thought to be involved in the regulation of NK and NKT cell function. Cyclo-Z treatment in normal subjects generally suppresses CD161A expression in both the blood and spleen NK cells. Mature STZ-treated test subjects expressed high levels of CD161, and Cyclo-Z treatment reduced CD161A expression in the NK cells. These data suggest that Cyclo-Z can down-regulate NK function of the immune system depending on the body need of immune stimulation.

5.10. Monocyte CD11b

CD11b is expressed on many leukocyte cell types, including macrophages, monocytes, granulocytes, and NK cells. It is involved in the innate immune system and mediates inflammation by controlling leukocyte cell adhesion and migration. Circulating immune cells from T1D subjects display many aspects of a pro-inflammatory state, indicated by activated monocytes, as discussed in "Increased expression of monocytes CD11b (Mac-1) in overweight recent-onset type 1 diabetic children," by Cifarelli et al., Rev. Diabet. Stud. 4:113-120 (2007), which is hereby incorporated herein by reference. It has also been observed that $CD11b^+$ monocytes patrol the luminal surface of the endothelium within tissues, as if they are acting as guards for tissue damage or pathogen invasion, and has been suggested that, during infection, the ultimate tissue response is the result of an orchestrated interplay between the various monocytes subsets that are induced to leave the blood and the differentiative plasticity of macrophages in tissue, as discussed in "Monocyte subpopulation and their differentiation patterns during infection," by Strauss-Ayali et al., J. Leukoc. Biol. 82:244-252 (2007), which is hereby incorporated herein by reference.

Figure 11A:
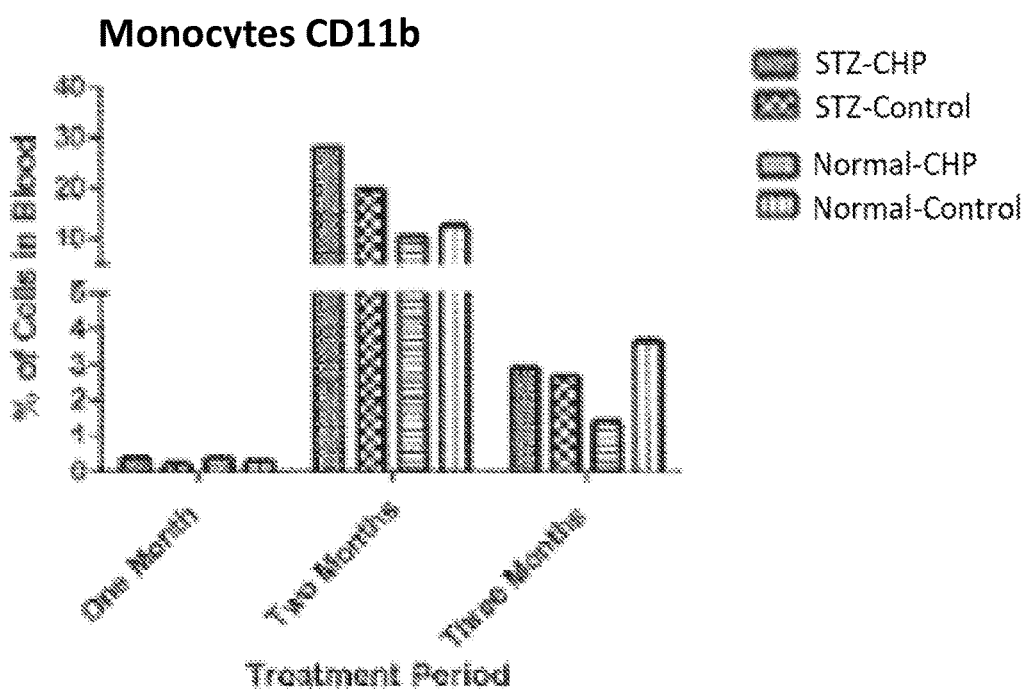
FIG. 11A. FACS analysis of CD11b$^+$ monocyte population in blood over three-month time course. Analysis of the same blood samples used in FIG. 1A. Blood was pooled for like groups, prior to FACS analysis for CD11b$^+$ monocyte levels.
Figure 11B:
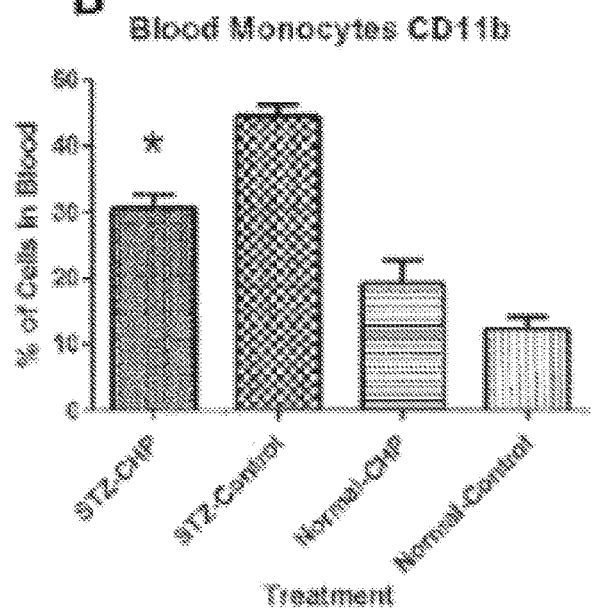
FIG. 11B. FACS analysis of CD11b$^+$ monocyte population in blood after four months of treatment (six months old). Test subjects in each group were sacrificed. For each individual test subject, blood was collected and analyzed for CD11b$^+$ monocyte levels, and the mean±SEM of each group was plotted in FIG. 11B.
Figure 11C:
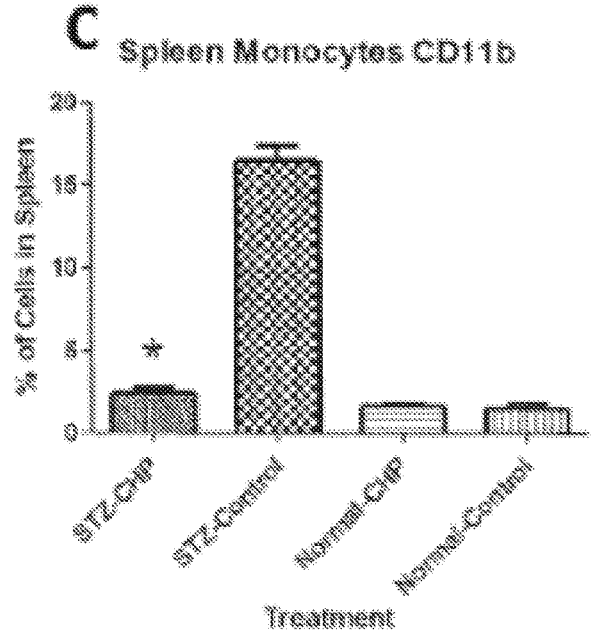
FIG. 11C. FACS analysis of CD11b$^+$ monocyte population in spleen after four months of treatment (six months old). Test subjects in each group were sacrificed. For each individual test subject, the spleen was collected and analyzed for CD11b$^+$ monocyte levels, and the mean±SEM of each group was plotted in FIG. 11C. *$p<0.05$ in comparison to untreated control for each group, diabetic or normal.

Monocyte $CD11b^+$ cell numbers increased after one month of Cyclo-Z treatment in both diabetic and normal subjects (FIG. 11A). However, after three months of Cyclo-Z treatment (five months old), normal subjects had significantly fewer $CD11b^+$ cells than untreated subjects, whereas diabetic subjects still showed increased numbers of $CD11b^+$ cells (FIG. 11A). In six-month-old subjects (four months of treatment), Cyclo-Z treatment significantly decreased $CD11b^+$ cells levels in STZ-diabetic subjects in the blood and spleen (p=0.05) compared to untreated subjects (FIGS. 11B-11C). However, in normal subjects, Cyclo-Z treatment only slightly increased $CD11b^+$ levels in the blood (p=0.1483) and did not alter levels in the spleen. These data again indicate that Cyclo-Z increases immune system components in younger subjects, regardless of health status, and may reduce the pro-inflammatory state in older diabetic subjects.

The CD11 protein is a heterodimer complex that consists of CD11b and CD18. CD11 is involved in numerous adhesion-related associations between immune cells (monocytes, macrophages, natural killer (NK) cells, and granulocytes). CD11 also regulates the uptake of complement-coated particles within cells. In normal test subjects, Cyclo-Z treatment exhibited no effects on blood $CD11b^+$ monocyte cell levels. However, Cyclo-Z treatment in STZ-induced diabetic test subjects showed suppressed $CD11b^+$ monocyte levels. This demonstrates that Cyclo-Z treatment is effective in suppressing inflammation in the mammalian immune system.

5.11. Dendritic Cells

Although B- and T-lymphocytes are the mediators of immunity, dendritic cells (DC) control their function, as discussed in "Dendritic cells and the control of immunity," by Banchereau et al., Nature 392:245-262 (1998), which is hereby incorporated herein by reference. DCs are antigen-presenting cells of the mammalian innate immune system, as discussed in "Dendritic cells and the immunity/tolerance decision," by Usharauli, Med. Hypo. 64:112-113 (2005), which is hereby incorporated herein by reference. DCs in the periphery capture and process antigens, express lymphocyte co-stimulator molecules, migrate to lymphoid organs, and secrete cytokines to initiate immune responses. Their main function is to act as messengers between the innate and adaptive immune system through interaction with T-cells. Thus, DCs can be a powerful tool for manipulation of the immune system.

Figure 12A:
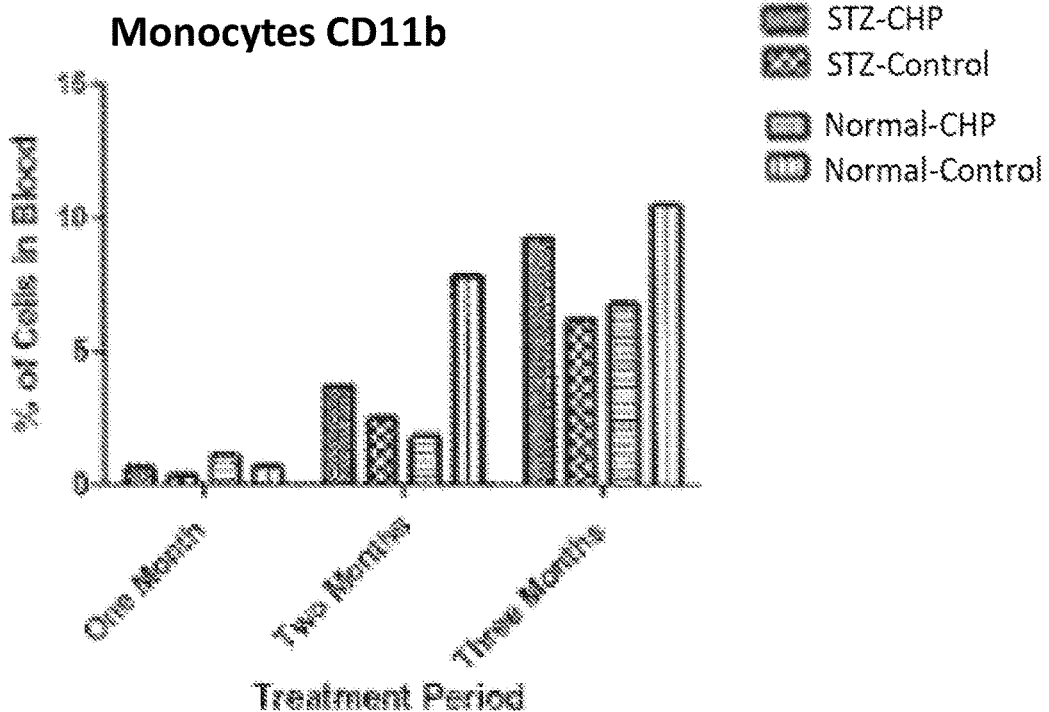
FIG. 12A. FACS analysis of Dendritic Cell (DC) population in blood over three-month time course. Analysis of the same blood samples used in FIG. 1A. Blood was pooled for like groups, prior to FACS analysis for DC levels.

Both STZ-induced T1D and normal subjects had increased levels of DCs at five months, in comparison to three months of age (FIG. 12A). Both diabetic and normal subjects, treated with Cyclo-Z for one month, had enhanced levels of DCs in the blood in comparison to untreated subjects. Diabetic subjects treated for two or three months also had elevated levels of DCs in comparison to untreated cells. Whereas, normal subjects treated with Cyclo-Z had decreased levels of DCs.

Figure 12B:
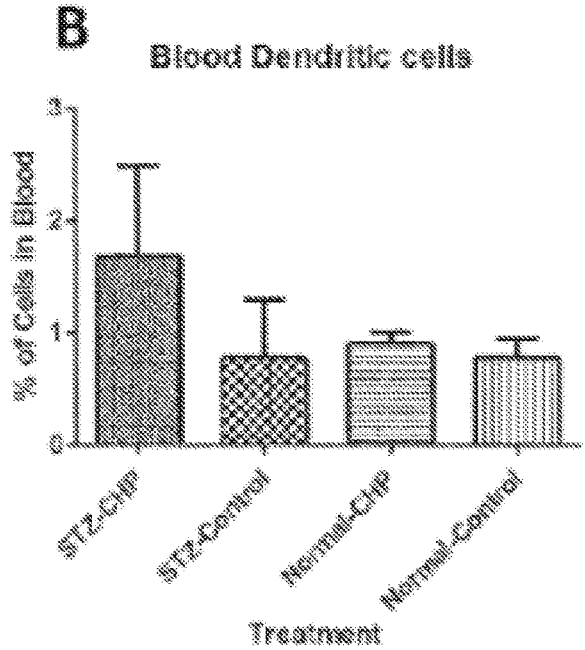
FIG. 12B. FACS analysis of DC population in blood after four months of treatment (six months old). Test subjects in each group were sacrificed. For each individual test subject, blood was collected and analyzed for DC levels, and the mean±SEM of each group was plotted in FIG. 12B.
Figure 12C:
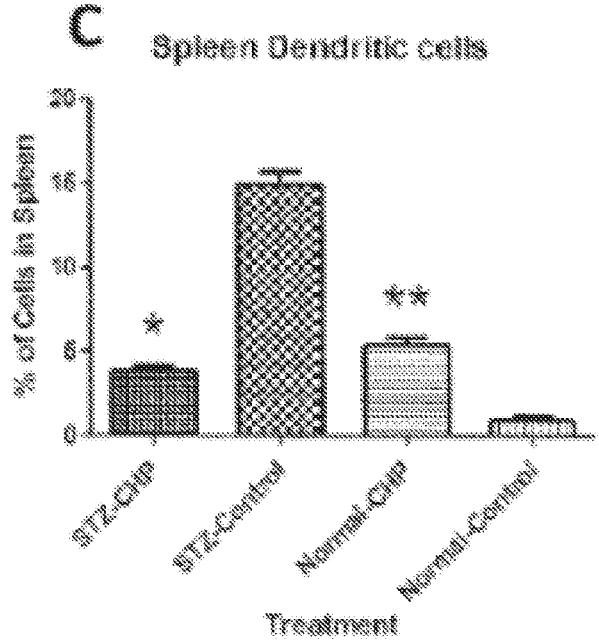
FIG. 12C. FACS analysis of DC population in spleen after four months of treatment (six months old). Test subjects in each group were sacrificed. For each individual test subject, the spleen was collected and analyzed for DC levels, and the mean±SFM of each group was plotted in FIG. 12C. *$p<0.05$ in comparison to untreated control for each group, diabetic or normal.

Diabetic subjects treated for four months (six months old) had slightly increased (not significantly) levels of dendritic cells in the blood Whereas, Cyclo-7 treatment did not affect levels in normal subjects (FIG. 12B). In the spleen tissue, Cyclo-Z-treated diabetic subjects had significantly decreased DC levels (p=0.5), and treated healthy subjects had significantly increased (p=0.0028) DC levels (FIG. 12C). Therefore, similar to the monocyte $CD11b^+$ cell data, Cyclo-Z appears to modulate inflammation and the immune system in both diabetic and healthy test subjects.

DCs are antigen-presenting cells (also known as accessory cells) of the mammalian immune system. Their main function is to process antigen material and present it on the cell surface to the T-cells of the immune system. Thus, they act as messengers between the innate and the adaptive immune systems. In normal test subjects, DC levels are suppressed (or no change) in the blood, but increased in the spleen. However, in STZ-induced diabetic test subjects, DC levels increased with Cyclo-Z treatment compared to controls, but decreased in the spleen. These data suggest that Cyclo-Z treatment can modulate both the innate and adaptive immune system by regulating DC levels.

6. Discussion

The immune system is a sophisticated collection of tissues that generally includes the blood and lymphatic system. The immune system is typically divided into two functional categories: innate and adaptive.

Innate immunity refers to nonspecific defense mechanisms that come into play immediately or within hours of a foreign antigen's appearance in the body.

Adaptive immunity is a specialized defense mechanism to respond to specific health threats (e.g., virus, cancer, etc.). During infancy, there is a physiological delay in production of immune factors in mammals, as discussed in "Evolution of immunologic functions of the mammary gland and the postnatal development of immunity," by Goldman et al., Pediatr. Res. 43:155-162 (1998), which is hereby incorporated herein by reference. At birth, the mammalian immune system is immature, and immunity is conferred from the mother's immune system through breast milk. The infant immune system develops and matures after weaning from the mother. The results, disclosed herein, demonstrate that Cyclo-Z treatment stimulates production of several types of innate and adaptive immune system components at an early physiological stage where the subjects are normally still developing the immune system.

The innate immune response defense mechanisms include physical barriers, such as skin, chemicals in the blood, and immune system cells including macrophages, DCs, and neutrophils that attack foreign bodies that invade the body. Critical to the innate immune system is the DCs and NK cells. Cyclo-Z treatment invariably increased DC populations in the blood at the age of three months (one month of treatment), regardless of the overall health (disease or normal) of the subjects, before the subjects had a fully developed immune system (FIG. 12A). Even after five to six months of age, when the subjects' immune systems have matured, Cyclo-Z treatment could stimulate DC levels in the spleen in normal subjects and reduce levels in diabetic subjects.

This data supports the hypothesis that Cyclo-Z treatment modulates the innate immune system in mammals. NKs, a type of cytotoxic lymphocyte, respond and kill viruses and infected cells around three days after infection. They do not require activation in order to kill cells that are missing "self" markers of major histocompatibility complex (MHC) class 1(44). NKs are known to differentiate and mature in the bone marrow, lymph node, spleen, tonsils, and thymus, where they then enter into the circulation. FIGS. 9A and 10A show that NK levels are increased with Cyclo-Z treatment in both diabetic and normal immature subjects. Older subjects had an elevated level of NKs in the blood in diabetic subjects and Cyclo-Z treatment decreased these levels as well as NKs levels in normal subjects (FIG. 10B). These data demonstrate that Cyclo-Z treatment can, in subjects with immature immune systems, stimulate the innate immune system to specifically increase numbers of DCs and NKs. However, Cyclo-Z can also modulate levels of NKs in healthy older subjects or subjects with extremely overactive immune systems due to disease (e.g., diabetes).

Adaptive immunity, the second arm of the mammalian immune system, refers to antigen-specific immune responses. The adaptive immune response is more complex than the innate response. An antigen must first be recognized and processed. Once an antigen has been recognized, the adaptive immune system creates an army of immune cells (T- or B-cells) specifically designed to attack that antigen. T-cells develop in the thymus, and acquire specific receptors that can recognize a foreign virus or cell. There are two basic types of T-cells: T-helper cells that help regulate the immune system; and cytotoxic I-cells that destroy infected cells, cancer cells, or foreign cells. During this process, B-cells are also activated to produce antibodies to target abnormal or invading cells. Specific antibodies bind to an invading foreign cell, rendering it harmless. Then, the complex is delivered to the lymph system for destruction. A critical feature of adaptive immunity is the development of immunologic memory or the ability of the system to learn or record its experiences with various antigens or pathogens, leading to effective and rapid immune responses upon subsequent exposure to the same or similar pathogens.

T-cells are a major cell component of the adaptive immune system and can be identified with the presence of $CD3^+$ protein marker. Cyclo-Z treatment enhanced levels of $CD3^+$ T-cells in diabetic subjects at the age of three and four months, and in normal subjects only at three months of age. Older subjects (four to six months old) show a decline in $CD3^+$ T-cell levels in normal subjects (FIGS. 1A and 1B). Spleen $CD3^+$ T-cell levels are also reduced by the Cyclo-Z treatment in normal subjects and diabetic subjects (FIG. 1C). It appears that, when normal subjects have too high a level of $CD3^+$ T-cells, Cyclo-Z can attenuate the levels. Thus, Cyclo-Z modulates the $CD3^+$ T-cell levels by increasing these cells when the T-cell numbers are low, and reduces $CD3^+$ T-cells levels when the numbers are too high.

Figure 4A:
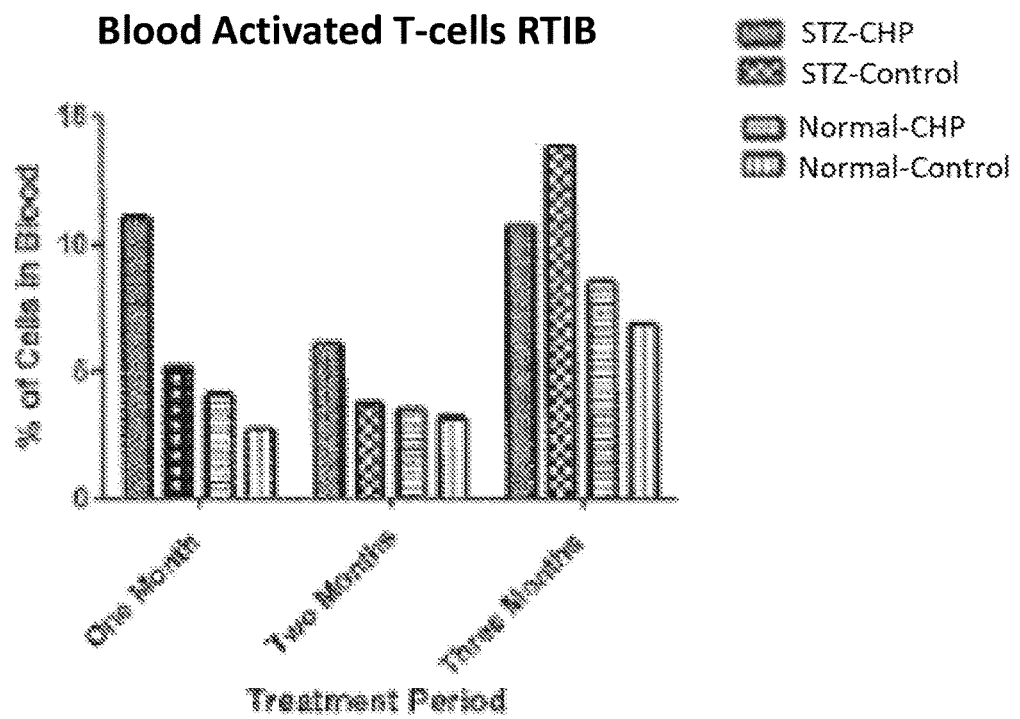
FIG. 4A. FACS analysis of $CD3^+$ $RTIB^+$ Activated T-cell population in blood over three-month time course. Analysis of the same blood samples used in FIG. 1A. Blood was pooled for like groups, prior to FACS analysis for $CD3^+$ $RTIB^+$ T-cell levels.
Figure 4B:
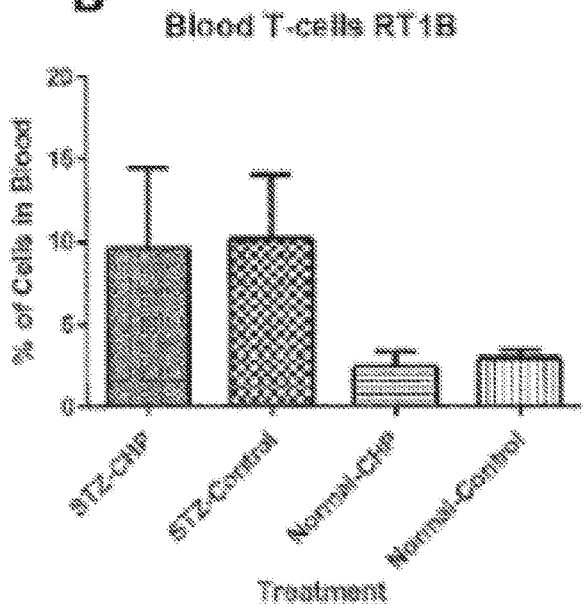
FIG. 4B. FACS analysis of $CD3^+$ $RTIB^+$ Activated T-cell population in blood after four months of treatment (six months old). Test subjects in each group were sacrificed. For each individual test subject, blood was collected and analyzed for $CD3^+$ $RTIB^+$ T-cell levels, and the mean±SEM of each group was plotted in FIG. 4B.

Levels of activated T-cells, as determined by the presence of RT1B or CD25 proteins on $CD3^+$ T-cells, were increased in three and four month old diabetic subjects with Cyclo-Z treatment (FIGS. 4A and 5A). Normal subjects also showed increased levels of $RT1B^+$ or $CD25^+$ T-cells at three months of age with Cyclo-Z treatment. Older subjects had varying effects with Cyclo-Z treatment in both diabetic and normal subjects at four months of age. At six months of age, there was no significant difference of $RT1B^+$ or $CD25^+$ T-cells in the blood with or without Cyclo-Z treatment. Although, in the spleen, there was a slight decrease in these cells in diabetic subjects and a significant increase in these cells in normal subjects. Therefore, Cyclo-Z treatment stimulates activation of the $CD3^+$ T-cells in the immature adaptive immune system, but has diverse effects in older subjects with mature immune systems.

CD3 T-cells can also be subdivided into: 1) cytotoxic T-cells, expressing the CDS surface protein, which destroy pathogen infected cells, cancer cells, and foreign cells; or 2) helper T-cells, expressing the CD4 surface marker, which regulate both the cellular and humoral immune systems. $CD4^+$ helper T-cells have been shown to reduce autoimmune reactions. Cyclo-Z significantly decreased levels of $CD3^+$ $CD8^+$ cytotoxic T-cells in the blood at six months of age (FIG. 3B). It had opposite effects on the levels of $CD3^+$ $CD4^+$ helper T-cells: slightly decreasing $CD3^-$ $CD4^+$ levels in diabetic subjects; and significantly increasing $CD3+CD4^+$ T-cells in normal subjects. Tt appears that Cyclo-Z treatment regulates the immune system by modulating $CD3^+$ $CD4^+$ and $CD3^+$ $CD8^+$ ratios depending on the health of the subject. In addition, $CD4^+$ CD25+ T– cells have been shown to play a critical role in maintaining peripheral tolerance and preventing autoimmunity, as discussed in "CD4+CD25+ Treg cells and IgA nephropathy patients with tonsillectomy: a clinical and pathological study," by Huang et al., Int. Urol. Nephrol., e-pub. ahead of print (2014), which is hereby incorporated herein by reference. Thus, the fact that, in normal cells, Cyclo-Z treatment induces levels of $CD4^-$ $CD25^+$ T-cells may indicate that it could have a potential role in the treatment of autoimmune diseases.

CD86 and CD80 have opposing functions through CD28 and CTLA-4 that manipulate immune responses and tolerance in vivo, as discussed in "CD86 and CD80 differentially modulate the suppressive function in human regulatory T cells," by Zheng et al., J. Immunol. 172:2778-2784 (2004), which is hereby incorporated herein by reference. Cyclo-Z had similar effects on both CD86 and $CD80^+$ AP cell levels in blood (FIGS. 9A, 9B, 10A, and 10B)—increasing both in the blood of diabetic subjects at all ages surveyed. In normal subjects, $CD86^+$ and $CD80^+$ AP cell levels were increased with Cyclo-Z treatment at the age of three months, then suppressed at the age of four to six months in both blood and spleen samples. These data again demonstrate that Cyclo-Z can modulate the immune system depending on the health and age of the subjects.

CD45RA antigen is present on the surface of more than 95% of B-lymphocytes in the purified tonsilar B-cell preparation. All stages of pre-B and B-cells express CD45RA antigens, as discussed in "Selective expression of CD45 isoforms defines CALL+ monoclonal B-lineage cells in peripheral blood from myeloma patients as late stage B cells," by Jensen et al., Blood 78:711-719 (1991), which is hereby incorporated herein by reference. $CD45RA^+$ B-cell levels were significantly increased with Cyclo-Z treatment at early stages of immune system development in diabetic (three and four months old) and normal (three months old) subjects (FIGS. 8A and 8B). At later stages of immune system maturation, Cyclo-Z treatment did not affect levels in the blood of diabetic and normal subjects, but significantly reduced CD45RA$^+$ B-cell levels in the spleen of normal subjects. These data suggest that Cyclo-Z is stimulatory in the activation of the humoral immune system—specifically numbers and activation of B-cells—in early development, but can modulate the humoral immune system in more mature subjects.

CD11b$^+$ monocyte levels were also elevated in diabetic and normal subjects with Cyclo-Z treatment, compared to their respective controls at three months of age (FIGS. 11A-11C). At six months of age, CD11b$^+$ monocyte levels were significantly decreased in the blood and spleen of diabetic subjects, but were also significantly reduced in normal subjects. Since diabetes is known to be a pro-inflammatory disease, this may indicate that Cyclo-Z may have the potential to modulate inflammatory reactions in diabetic subjects.

In conclusion, the clinical manifestation of inflammatory diseases (such as T1D and T2D) is expected to be associated with changes in activation-related biomarkers in circulating immune cells. Cyclo-Z treatment invariably increased immune cell levels and activities involved in the innate (dendritic cells, monocytes, natural killer cells), adaptive (cytotoxic CD8$^+$ and helper CD4$^+$ T-cells, antigen presenting cells), and humoral (B-cells) immune system when the subjects were young and the immune system still immature (three months old) in both diabetic and normal subjects. Thus, Cyclo-Z is effective in the stimulation of immune system components which may be helpful in fighting infectious agents earlier than possible in young naïve or immature subjects. In older normal subjects, Cyclo-Z treatment may modulate levels of several components involved in inflammation (decreasing monocytes, CD8$^+$ T-cells levels) and autoimmune diseases (increasing CD4$^+$ helper T-cells levels), suggesting potential benefits in the treatment of autoimmune disease.

What is claimed is:

1. A method of treating a patient subject having an immune-disorder, the method comprising orally administering cyclic histidyl-proline plus zinc (Cyclo-Z) to the patient subject,
wherein the immune-disorder is not diabetes,
wherein the disorder is a cold, influenza, bacterial infection, or allergy, and
wherein Cyclo-Z modulates the innate immune system.

2. The method of claim 1, wherein the Cyclo-Z is orally administered to the patient via a capsule.

3. The method of claim 2, wherein the capsule is taken 1-4 times per day.

4. The method of claim 3, wherein the capsule is taken once between waking up and breakfast, once between breakfast and lunch, once between lunch and dinner, and once between dinner and bedtime.

5. The method of claim 2, wherein the capsule is taken 2 times per day.

6. The method of claim 5, wherein the capsule is taken once between waking up and breakfast and once between breakfast and dinner or bedtime.

7. The method of claim 2, wherein the capsule is taken once per day at bedtime.

8. The method of claim 1, wherein the Cyclo-Z comprises 5 mg/L of cyclic histidyl-proline and 20 mg/L of zinc.

9. The method of claim 1, wherein the Cyclo-Z is administered to the patient 1-times per day.

10. The method of claim 1, wherein immune cells are increased.

11. The method of claim 10, wherein the immune cells are innate immune cells.

* * * * *